(12) United States Patent
Ichikawa et al.

(10) Patent No.: US 10,901,549 B2
(45) Date of Patent: Jan. 26, 2021

(54) PROGRAM, COMPUTER APPARATUS, PROGRAM EXECUTION METHOD, AND SYSTEM

(71) Applicant: SQUARE ENIX CO., LTD., Tokyo (JP)

(72) Inventors: Masanori Ichikawa, Tokyo (JP); Sachiko Sugimura, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 121 days.

(21) Appl. No.: 16/086,948

(22) PCT Filed: Jan. 19, 2017

(86) PCT No.: PCT/JP2017/001710
§ 371 (c)(1),
(2) Date: Sep. 20, 2018

(87) PCT Pub. No.: WO2017/163566
PCT Pub. Date: Sep. 28, 2017

(65) Prior Publication Data
US 2019/0129563 A1    May 2, 2019

(30) Foreign Application Priority Data
Mar. 23, 2016  (JP) .................. 2016-059301

(51) Int. Cl.
*G06F 3/041*     (2006.01)
*G06F 3/0488*    (2013.01)
*A63F 13/2145*   (2014.01)

(52) U.S. Cl.
CPC ........ *G06F 3/0416* (2013.01); *G06F 3/04883* (2013.01); *G06F 3/04886* (2013.01); *A63F 13/2145* (2014.09)

(58) Field of Classification Search
CPC .............. G06F 3/0416; G06F 3/04883; G06F 3/04886; A63F 13/2145
See application file for complete search history.

(56) References Cited

U.S. PATENT DOCUMENTS

2006/0019752 A1    1/2006 Ohta
2008/0026843 A1*   1/2008 Nakasaka .............. A63F 13/00
                                                       463/37
(Continued)

FOREIGN PATENT DOCUMENTS

JP    2000-222130    8/2000
JP    2006-034516    2/2006
(Continued)

OTHER PUBLICATIONS

Official Action from Japan Patent Office (JPO) in Japanese Patent Appl. No. 2016-059301, dated Oct. 11, 2016, together with a partial English language translation.
(Continued)

*Primary Examiner* — Rodney Amadiz
(74) *Attorney, Agent, or Firm* — Greenblum & Bernstein, P.L.C.

(57) ABSTRACT

Provided is a program which is executed in a device capable of outputting information on the basis of a user's contact position on an operation unit, the program causing the device to function as a setter that sets the contact position as a reference point, an identificator that identifies a direction from a first point to a second point of the contact position on the basis of a predetermined period or distance in a case where the contact position is moved, a determinator that determines a change of the direction by comparing a first direction and a second direction with each other when the direction identified in a case where the first point is a reference point is set to be the first direction and a direction
(Continued)

identified in a case where a present contact position is set to be the second point is set to be the second direction.

16 Claims, 21 Drawing Sheets

(56) References Cited

U.S. PATENT DOCUMENTS

| | | | |
|---|---|---|---|
| 2008/0036769 A1* | 2/2008 | Coutts | G06T 11/20 345/441 |
| 2012/0154311 A1 | 6/2012 | Iijima et al. | |
| 2013/0154974 A1 | 6/2013 | Murata | |
| 2015/0331511 A1 | 11/2015 | Jeong et al. | |

FOREIGN PATENT DOCUMENTS

| | | |
|---|---|---|
| JP | 2012-133481 | 7/2012 |
| JP | 2013-127683 | 6/2013 |
| JP | 2014-032568 | 2/2014 |
| JP | 2014-044455 | 3/2014 |
| JP | 2015-219912 | 12/2015 |

OTHER PUBLICATIONS

Official Action from Japan Patent Office (JPO) in Japanese Patent Appl. No. 2016-059301, dated Mar. 14, 2017, together with a partial English language translation.

Official Action from Japan Patent Office (JPO) in Japanese Patent Appl. No. 2016-059301, dated Feb. 6, 2018, together with a partial English language translation.

Official Action from Japan Patent Office (JPO) in Japanese Patent Appl. No. 2016-059301, dated Jul. 3, 2018, together with a partial English language translation.

Official Action from Japan Patent Office (JPO) in Japanese Patent Appl. No. 2016-059301, dated Oct. 30, 2018, together with an English language translation.

Official Action from Japan Patent Office (JPO) in Japanese Patent Appl. No. 2017-117021, dated Feb. 20, 2018, together with a partial English language translation.

Official Action from Japan Patent Office (JPO) in Japanese Patent Appl. No. 2017-117021, dated Jul. 3, 2018, together with a partial English language translation.

International Search Report (ISR) from International Searching Authority (Japan Patent Office) in International Pat. Appl. No. PCT/JP2017/001710, dated Mar. 14, 2017.

* cited by examiner

| ASSIGNMENT DIRECTION | ANGLE LOWER LIMIT | ANGLE UPPER LIMIT |
|---|---|---|
| RIGHT | -22.5(337.5) | 22.5 |
| UPPER RIGHT | 22.5 | 67.5 |
| UPPER | 67.5 | 112.5 |
| UPPER LEFT | 112.5 | 157.5 |
| LEFT | 157.5 | 202.5 |
| LOWER LEFT | 202.5 | 247.5 |
| LOWER | 247.5 | 292.5 |
| LOWER RIGHT | 292.5 | 337.5 |

PROGRAM, COMPUTER APPARATUS, PROGRAM EXECUTION METHOD, AND SYSTEM

TECHNICAL FIELD

The present invention relates to a program, a computer apparatus, a program execution method, and a system which enable an intuitive operation and are capable of reducing an operation burden on a user.

BACKGROUND ART

Hitherto, panels including a display unit that displays information and an input unit that receives a user's input have been provided. When an operation instruction is given using such a panel (hereinafter, referred to as a touch panel), a method has been proposed in which a virtual controller (hereinafter, referred to as a virtual controller) is displayed by imaging the shape of a controller, and an operation input is received by a user's contact with an image by the user's finger, a stylus, or the like (hereinafter, referred to as a finger or the like).

For example, Patent Literature 1 discloses that reference coordinates which are the center of a movable range of a lever are brought close to a touched position when the position is touched beyond the movable range of the lever in a case where a joystick is used as a virtual controller of a touch panel. In addition, Patent Literature 2 discloses that a reference position is moved close to the latest touch position in a case where the latest touch position is slid beyond the range of a predetermined reference region in a touch panel.

CITATION LIST

Patent Literature

Patent Literature 1: JP 2006-34516 A
Patent Literature 2: JP 2014-44455 A

SUMMARY OF INVENTION

Technical Problem

However, in both Patent Literature 1 and Patent Literature 2, the reference position and the latest touch position are separated from each other, and thus movement has to be performed beyond the reference position in order to input an operation instruction in the left direction in a case where a user's operation instruction information is input, for example, the operation instruction in the right direction is input toward a screen.

An object of at least one embodiment of the invention is to enable an intuitive operation and reduce an operation burden on a user.

Solution to Problem

According to a non-limiting aspect, a program which is executed in a computer apparatus capable of outputting information on the basis of a user's contact position on an operation unit, the program causing the computer apparatus to function as: a reference point setter that sets the user's any one contact position on the operation unit as a reference point; a direction identificator that identifies a direction of a second point with respect to a first point when the contact position before the elapse of a predetermined period is defined as the first point and the contact position after the elapse of the predetermined period is defined as the second point in a case where the contact position is moved, or when the contact position before movement at a predetermined distance is defined as the first point and the contact position after movement at the predetermined distance is defined as the second point in a case where the contact position is moved; a direction change determinator that determines whether or not the direction has been changed by comparing a first direction and a second direction with each other when the direction identified by the direction identificator is defined as the first direction in a case where the first point is a reference point and the direction identified by the direction identificator is defined as the second direction in a case where a present contact position is set to be the second point; a reference point updator that updates the first point when the present contact position is set to be the second point, as a reference point in a case where it is determined that the direction has been changed; and an information outputter that outputs information based on the direction identified by the direction identificator, wherein in a case where the reference point is updated by the reference point updator, the direction identificator, the direction change determinator, the reference point updator, and the information outputter are executed on the basis of the updated reference point.

According to a non-limiting aspect, a computer apparatus which is capable of outputting information on the basis of a user's contact position on an operation unit, the computer apparatus comprising: a reference point setter that sets the user's any one contact position on the operation unit as a reference point; a direction identificator that identifies a direction of a second point with respect to a first point when the contact position before the elapse of a predetermined period is defined as the first point and the contact position after the elapse of the predetermined period is defined as the second point in a case where the contact position is moved, or when the contact position before movement at a predetermined distance is defined as the first point and the contact position after movement at the predetermined distance is defined as the second point in a case where the contact position is moved; a direction change determinator that determines whether or not the direction has been changed by comparing a first direction and a second direction with each other when the direction identified by the direction identificator is defined as the first direction in a case where the first point is a reference point and the direction identified by the direction identificator is defined as the second direction in a case where a present contact position is set to be the second point; a reference point updator that updates the first point when the present contact position is set to be the second point, as a reference point in a case where it is determined that the direction has been changed; and an information outputter that outputs information based on the direction identified by the direction identificator, wherein in a case where the reference point is updated by the reference point updator, the direction identificator, the direction change determinator, the reference point updator, and the information outputter are executed on the basis of the updated reference point.

According to a non-limiting aspect, a program execution method which is executed in a computer apparatus capable of outputting information on the basis of a user's contact position on an operation unit, the program execution method comprising: a step of setting the user's any one contact position on the operation unit as a reference point; a step of identifying a direction of a second point with respect to a first point when the contact position before the elapse of a predetermined period is defined as the first point and the contact position after the elapse of the predetermined period is defined as the second point in a case where the contact position is moved, or when the contact position before movement at a predetermined distance is defined as the first point and the contact position after movement at the predetermined distance is defined as the second point in a case where the contact position is moved; a step of determining whether or not the direction has been changed by comparing a first direction and a second direction with each other when the direction identified in the step of identifying the direction is defined as the first direction in a case where the first point is a reference point and the direction identified in the step of identifying the direction is defined as the second direction in a case where a present contact position is set to be the second point; a step of updating the first point when the present contact position is set to be the second point, as a reference point in a case where it is determined that the direction has been changed; and a step of outputting information based on the direction identified in the step of identifying the direction, wherein in a case where the reference point is updated in the step of updating the reference point, the step of identifying the direction, the step of determining the change of the direction, the step of updating the reference point, and the step of outputting the information are executed on the basis of the updated reference point.

According to a non-limiting aspect, a program which is executed in a server apparatus capable of communicating with a computer apparatus including an operation unit and outputting information on the basis of a user's contact position on the operation unit, the program causing the server apparatus to function as: a reference point setter that sets the user's any one contact position on the operation unit as a reference point; a direction identificator that identifies a direction of a second point with respect to a first point when the contact position before the elapse of a predetermined period is defined as the first point and the contact position after the elapse of the predetermined period is defined as the second point in a case where the contact position is moved, or when the contact position before movement at a predetermined distance is defined as the first point and the contact position after movement at the predetermined distance is defined as the second point in a case where the contact position is moved; a direction change determinator that determines whether or not the direction has been changed by comparing a first direction and a second direction with each other when the direction identified by the direction identificator is defined as the first direction in a case where the first point is a reference point and the direction identified by the direction identificator is defined as the second direction in a case where a present contact position is set to be the second point; a reference point updator that updates the first point when the present contact position is set to be the second point, as a reference point in a case where it is determined that the direction has been changed; and an information outputter that outputs information based on the direction identified by the direction identificator, wherein in a case where the reference point is updated by the reference point updator, the direction identificator, the direction change determinator, the reference point updator, and the information outputter are executed on the basis of the updated reference point.

According to a non-limiting aspect, a system which includes a computer apparatus including an operation unit and a server apparatus capable of communicating with the computer apparatus, and which is capable of outputting information on the basis of a user's contact position on the operation unit, the system comprising: a reference point setter that sets the user's any one contact position on the operation unit as a reference point; a direction identificator that identifies a direction of a second point with respect to a first point when the contact position before the elapse of a predetermined period is defined as the first point and the contact position after the elapse of the predetermined period is defined as the second point in a case where the contact position is moved, or when the contact position before movement at a predetermined distance is defined as the first point and the contact position after movement at the predetermined distance is defined as the second point in a case where the contact position is moved; a direction change determinator that determines whether or not the direction has been changed by comparing a first direction and a second direction with each other when the direction identified by the direction identificator is defined as the first direction in a case where the first point is a reference point and the direction identified by the direction identificator is defined as the second direction in a case where a present contact position is set to be the second point; a reference point updator that updates the first point when the present contact position is set to be the second point, as a reference point in a case where it is determined that the direction has been changed; and an information outputter that outputs information based on the direction identified by the direction identificator, wherein the computer apparatus includes a position receptor that receives the user's contact position on the operation unit, as a contact position, and an information display that displays the output information, and wherein in a case where the reference point is updated by the reference point updator, the direction identificator, the direction change determinator, the reference point updator, and the information outputter are executed on the basis of the updated reference point.

According to a non-limiting aspect, a non-transitory computer-readable recording medium including a program which is executed in a computer apparatus capable of communicating with a server apparatus, the program causing the computer apparatus to function as: a position receptor that receives a user's contact position on an operation unit, as a contact position; and an information display that displays the output information, and wherein the server apparatus functions as a reference point setter that sets the user's any one contact position on the operation unit as a reference point, a direction identificator that identifies a direction of a second point with respect to a first point when the contact position before elapse of a predetermined period is defined as the first point and the contact position after elapse of the predetermined period is defined as the second point in a case where the contact position is moved, or when the contact position before movement at a predetermined distance is defined as the first point and the contact position after movement at the predetermined distance is defined as the second point in a case where the contact position is moved, a direction change determinator that determines whether or not the direction has been changed by comparing a first direction and a second direction with each other when the direction identified by the direction identificator is defined as the first direction in a case where the first point is a reference point and the direction identified by the direction identificator is defined as the second direction in a case where the present contact position is set to be the second point, a reference point updator that updates the first point when the present contact position is set to be the second point, as a reference point in a case where it is determined that the direction has been changed, and an information outputter that outputs information based on the direction identified by the direction identificator, and wherein in a case where the reference point is updated by the reference point updator, the direction identificator, the direction change determinator, the reference point updator, and the information outputter are executed on the basis of the updated reference point.

According to a non-limiting aspect, a non-transitory computer-readable recording medium including a program which is executed in a computer apparatus capable of outputting information on the basis of a user's contact position on an operation unit, the program causing the computer apparatus to function as: a reference point setter that sets the user's contact position on the operation unit as a reference point, for each predetermined period or whenever the contact position is moved at a predetermined distance; a direction identificator that identifies the direction of the contact position with respect to the reference point, for each predetermined period or whenever the contact position is moved at a predetermined distance; and an information outputter that outputs information based on the direction identified by the direction identificator.

According to a non-limiting aspect, a computer apparatus which is capable of outputting information on the basis of a user's contact position on an operation unit, the computer apparatus comprising: a reference point setter that sets the user's contact position on the operation unit as a reference point, for each predetermined period or whenever the contact position is moved at a predetermined distance; a direction identificator that identifies the direction of the contact position with respect to the reference point, for each predetermined period or whenever the contact position is moved at a predetermined distance; and an information outputter that outputs information based on the direction identified by the direction identificator.

According to a non-limiting aspect, a program execution method which is executed in a computer apparatus capable of outputting information on the basis of a user's contact position on an operation unit, the program execution method comprising: a step of setting the user's contact position on the operation unit as a reference point, for each predetermined period or whenever the contact position is moved at a predetermined distance; a step of identifying the direction of the contact position with respect to the reference point, for each predetermined period or whenever the contact position is moved at a predetermined distance; and a step of outputting information based on the direction identified by the direction identificator.

According to a non-limiting aspect, a program which is executed in a server apparatus capable of communicating with a computer apparatus including an operation unit and outputting information on the basis of a user's contact position on the operation unit, the program causing the server apparatus to function as: a reference point setter that sets the user's contact position on the operation unit as a reference point, for each predetermined period or whenever the contact position is moved at a predetermined distance; a direction identificator that identifies the direction of the contact position with respect to the reference point, for each predetermined period or whenever the contact position is moved at a predetermined distance; and an information outputter that outputs information based on the direction identified by the direction identificator.

According to a non-limiting aspect, a system which includes a computer apparatus including an operation unit and a server apparatus capable of communicating with the computer apparatus, and which is capable of outputting information on the basis of a user's contact position on the operation unit, the system comprising: a reference point setter that sets the user's contact position on the operation unit as a reference point, for each predetermined period or whenever the contact position is moved at a predetermined distance; a direction identificator that identifies the direction of the contact position with respect to the reference point, for each predetermined period or whenever the contact position is moved at a predetermined distance; and an information outputter that outputs information based on the direction identified by the direction identificator, wherein the computer apparatus includes a position receptor that receives the user's contact position on the operation unit, as a contact position, and an information display that displays the output information.

According to a non-limiting aspect, a program which is executed in a computer apparatus capable of communicating with a server apparatus capable of outputting information, on the basis of a user's contact position on an operation unit, the program causing the computer apparatus to function as: a position receptor that receives the user's contact position on the operation unit, as a contact position; and an information display that displays the output information, and wherein the server apparatus functions as a reference point setter that sets the user's contact position on the operation unit as a reference point, for each predetermined period or whenever the contact position is moved at a predetermined distance, a direction identificator that identifies a direction of the contact position with respect to the reference point, for each predetermined period or whenever the contact position is moved at a predetermined distance, and an information outputter that outputs information based on the direction identified by the direction identificator.

Advantageous Effects of Invention

One or more of the above problems can be solved with each embodiment of the present invention.

DESCRIPTION OF EMBODIMENTS

Hereinafter, embodiments of the invention will be described with reference to the accompanying drawings. Hereinafter, description relating to effects shows an aspect of the effects of the embodiments of the invention, and does not limit the effects. Further, the order of respective processes that form a flowchart described below may be changed in a range without contradicting or creating discord with the processing contents thereof.

First Embodiment

Figure 1:
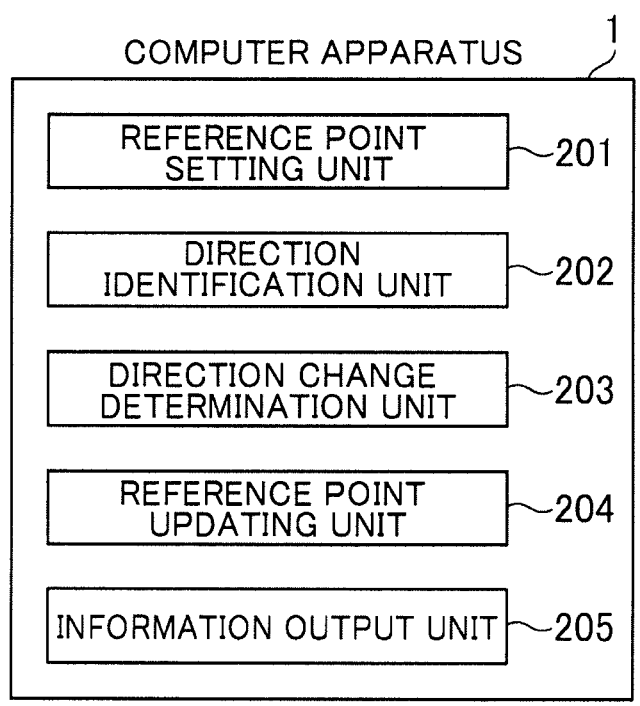
FIG. 1 is a block diagram illustrating a configuration of a computer apparatus, which corresponds to at least one embodiment of the invention.

Next, an outline of a first embodiment of the invention will be described. FIG. 1 is a block diagram illustrating a configuration of a computer apparatus, which corresponds to at least one embodiment of the invention. A computer apparatus 1 includes at least a reference point setting unit 201, a direction identification unit 202, a direction change determination unit 203, a reference point updating unit 204, and an information output unit 205.

The reference point setting unit 201 has a function of setting a user's any one contact position on an operation unit as a reference point. The direction identification unit 202 has a function of identifying a direction of a second point with respect to a first point when the contact position before the elapse of a predetermined period is defined as the first point and the contact position after the elapse of the predetermined period is defined as the second point in a case where the contact position is moved, or when the contact position before movement at a predetermined distance is defined as the first point and the contact position after movement at the predetermined distance is defined as the second point in a case where the contact position is moved.

The direction change determination unit 203 has a function of determining whether or not the direction has been changed by comparing a first direction and a second direction with each other, when the direction identified by the direction identification unit 202 is defined as the first direction in a case where the first point is a reference point, and the direction identified by the direction identification unit 202 is defined as the second direction in a case where the present contact position is set to be the second point.

The reference point updating unit 204 has a function of updating the first point in a case where the present contact position is set to be the second point, as a reference point in a case where the direction change determination unit 203 determines that the direction has been changed. The information output unit 205 has a function of outputting information based on the direction identified by the direction identification unit 202.

Figure 2:
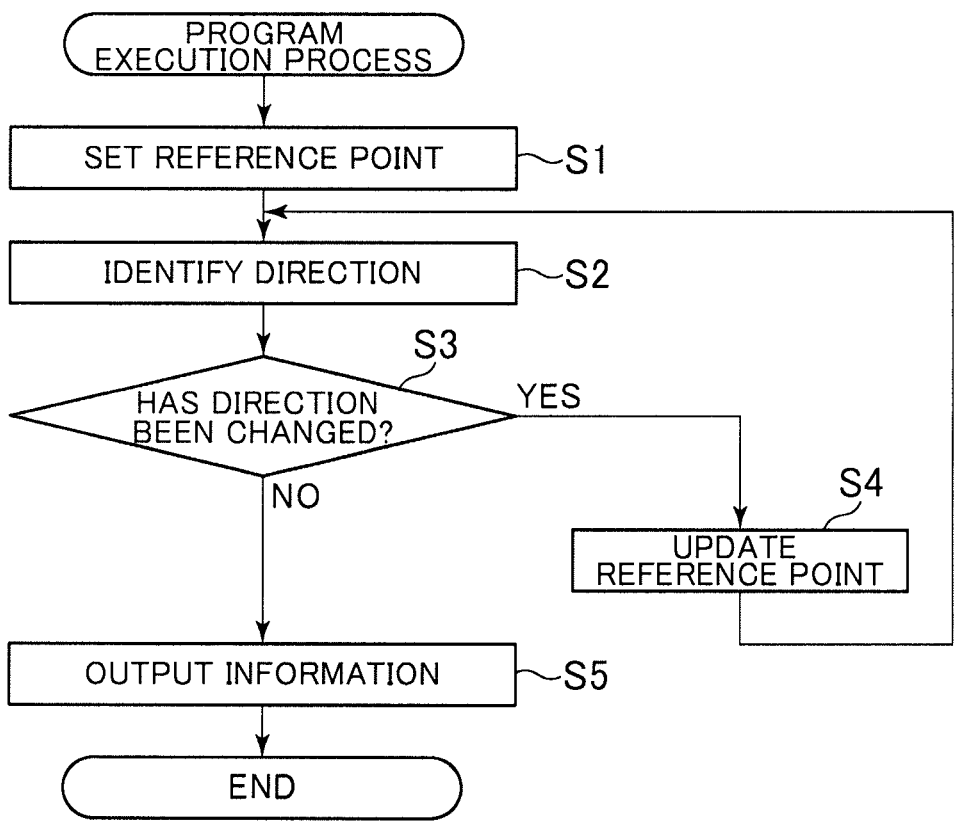
FIG. 2 is a flow chart illustrating a program execution process, which corresponds to at least one embodiment of the invention.

A program execution process in the first embodiment of the invention will be described. FIG. 2 is a flowchart of the program execution process, which corresponds to at least one embodiment of the invention.

The computer apparatus 1 sets the user's any one contact position on the operation unit as a reference point (step S1). A direction of a second point with respect to a first point is identified when the contact position before the elapse of a predetermined period is defined as the first point and the contact position after the elapse of the predetermined period is defined as the second point in a case where the contact position is moved, or when the contact position before movement at a predetermined distance is defined as the first point and the contact position after movement at the predetermined distance is defined as the second point in a case where the contact position is moved (step S2).

It is determined whether or not the direction has been changed by comparing a first direction and a second direction with each other, when the direction identified by the direction identification unit 202 is defined as the first direction in a case where the first point is a reference point, and the direction identified by the direction identification unit 202 is defined as the second direction in a case where the present contact position is set to be the second point (step S3). In step S3, in a case where it is determined that the direction has been changed (YES in step S3), the first point in a case where the present contact position is set to be the second point is updated as a reference point (step S4).

Information based on the direction identified by the direction identification unit 202 is output (step S5), and the program execution process is terminated.

In the first embodiment, in a case where the reference point is updated by the reference point updating unit 204, the identification of the direction in step S2, the determination of the change of the direction in step S3, the update of the reference point in step S4, and the output of the information in step S5 are executed on the basis of the updated reference point.

As an aspect of the first embodiment, it is not necessary to separate a finger or the like from the screen once and bring the finger or the like into contact with the virtual controller again when attempting to change a direction to be input, and thus it is possible to enable an intuitive operation and reduce an operation burden on a user.

In the first embodiment, the "operation unit" has a function of receiving an input, for example, by the user's operation. The "computer apparatus" refers to a device such as a mobile phone, a smart phone, a tablet computer, or a portable game machine. The "reference point" is a point to be reference for identifying an angle, a direction, a length, and the like, for example, by a contact with the operation unit.

The "movement of contact position" refers to the change of a position being in contact with, for example, a finger, a stylus, or the like. The "direction" refers to, for example, the direction of a second point with respect to a first point. The "change of direction" means that, for example, a first direction and a second direction are not the same direction. The "determination" means that, for example, determination is performed by comparing the first direction and the second direction with each other to ascertain whether or not a change has been made.

The "update" means that, for example, a first point in a case where the present contact position is set to be a second point is rewritten as a reference point. The "information" refers to, for example, an instruction, a signal, or the like which is output on the basis of a contact position on the operation unit.

Second Embodiment

Figure 3:
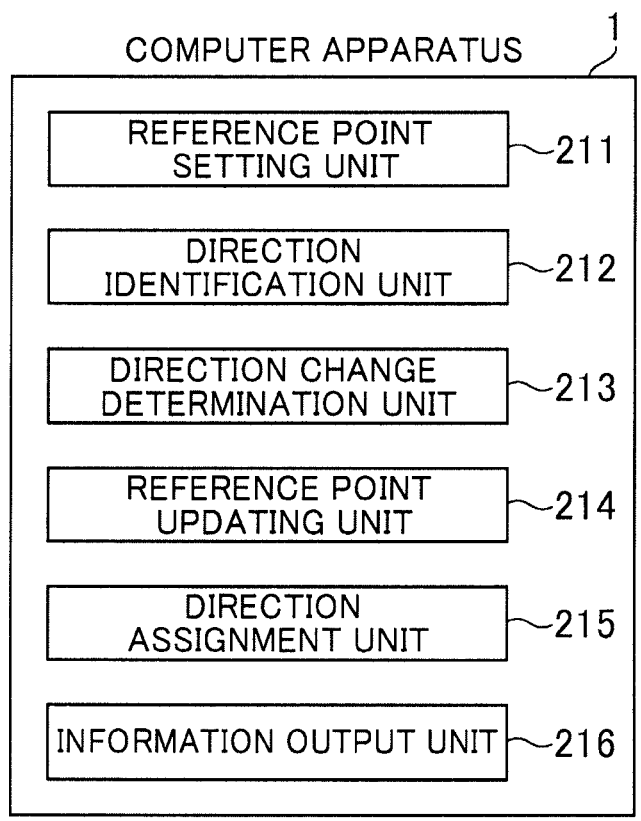
FIG. 3 is a block diagram illustrating a configuration of a computer apparatus, which corresponds to at least one embodiment of the invention.

Next, an outline of a second embodiment of the invention will be described. FIG. 3 is a block diagram illustrating a configuration of a computer apparatus, which corresponds to at least one embodiment of the invention. A computer apparatus 1 includes at least a reference point setting unit 211, a direction identification unit 212, a direction change determination unit 213, a reference point updating unit 214, a direction assignment unit 215, and an information output unit 216.

The reference point setting unit 211 has a function of setting a user's any one contact position on an operation unit as a reference point. The direction identification unit 212 has a function of identifying a direction of a second point with respect to a first point when the contact position before the elapse of a predetermined period is defined as the first point and the contact position after the elapse of the predetermined period is defined as the second point in a case where the contact position is moved, or when the contact position before movement at a predetermined distance is defined as the first point and the contact position after movement at the predetermined distance is defined as the second point in a case where the contact position is moved.

The direction change determination unit 213 has a function of determining whether or not the direction has been changed by comparing a first direction and a second direction with each other, when the direction identified by the direction identification unit 212 is defined as the first direction in a case where the first point is a reference point, and the direction identified by the direction identification unit 212 is defined as the second direction in a case where the present contact position is set to be the second point.

The reference point updating unit 214 has a function of updating the first point in a case where the present contact position is set to be the second point, as a reference point in a case where the direction change determination unit 213 determines that the direction has been changed. The direction assignment unit 215 has a function of assigning the direction identified by the direction identification unit 212 to any one of a plurality of set directions which are set in advance, in accordance with the direction. The information output unit 216 has a function of outputting information based on the direction assigned by the direction assignment unit 215.

Figure 4:
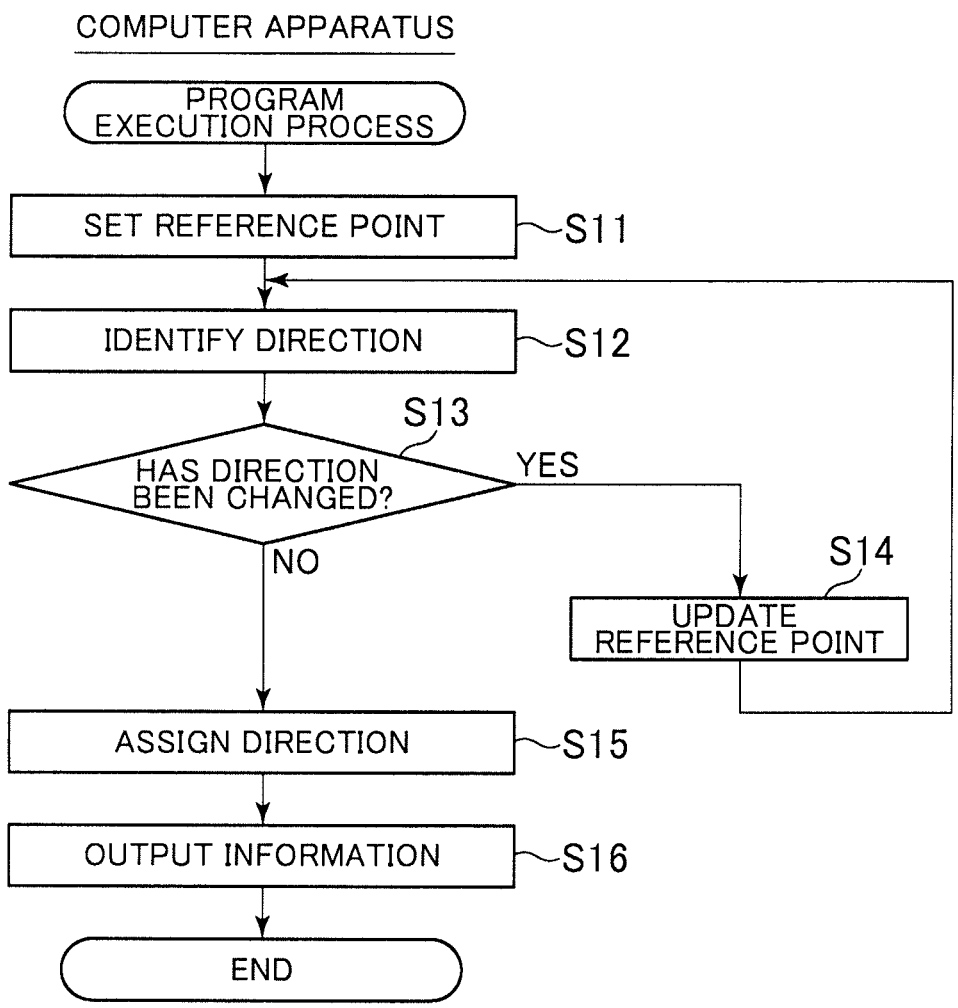
FIG. 4 is a flow chart illustrating a program execution process, which corresponds to at least one embodiment of the invention.

A program execution process in the second embodiment of the invention will be described. FIG. 4 is a flowchart of the program execution process, which corresponds to at least one embodiment of the invention.

The computer apparatus 1 sets the user's any one contact position on the operation unit as a reference point (step S11). A direction of a second point with respect to a first point is identified when the contact position before the elapse of a predetermined period is defined as the first point and the contact position after the elapse of the predetermined period is defined as the second point in a case where the contact position is moved, or when the contact position before movement at a predetermined distance is defined as the first point and the contact position after movement at the predetermined distance is defined as the second point in a case where the contact position is moved (step S12).

It is determined whether or not the direction has been changed by comparing a first direction and a second direction with each other, when the direction identified by the direction identification unit 212 is defined as the first direction in a case where the first point is a reference point, and the direction identified by the direction identification unit 212 is defined as the second direction in a case where the present contact position is set to be the second point (step S13). In step S13, in a case where it is determined that the direction has been changed (YES in step S13), the first point in a case where the present contact position is set to be the second point is updated as a reference point (step S14).

The direction identified by the direction identification unit 212 is assigned to any one of the plurality of set directions which are set in advance, in accordance with the direction (step S15). Information based on the direction assigned by the direction assignment unit 215 is output (step S16), and the program execution process is terminated.

As an aspect of the second embodiment, the direction identified by the direction identification unit 212 is assigned to any one of the plurality of set directions which are set in advance, in accordance with the direction, and thus the user's direction instruction operation is simplified and an intuitive operation can be performed.

In the second embodiment, each of the "operation unit", the "computer apparatus", the "reference point", the "movement of contact position", the "direction", the "change of direction", the "determination", the "update", and the "information" has the same contents as those described in the first embodiment.

Third Embodiment

Figure 5:
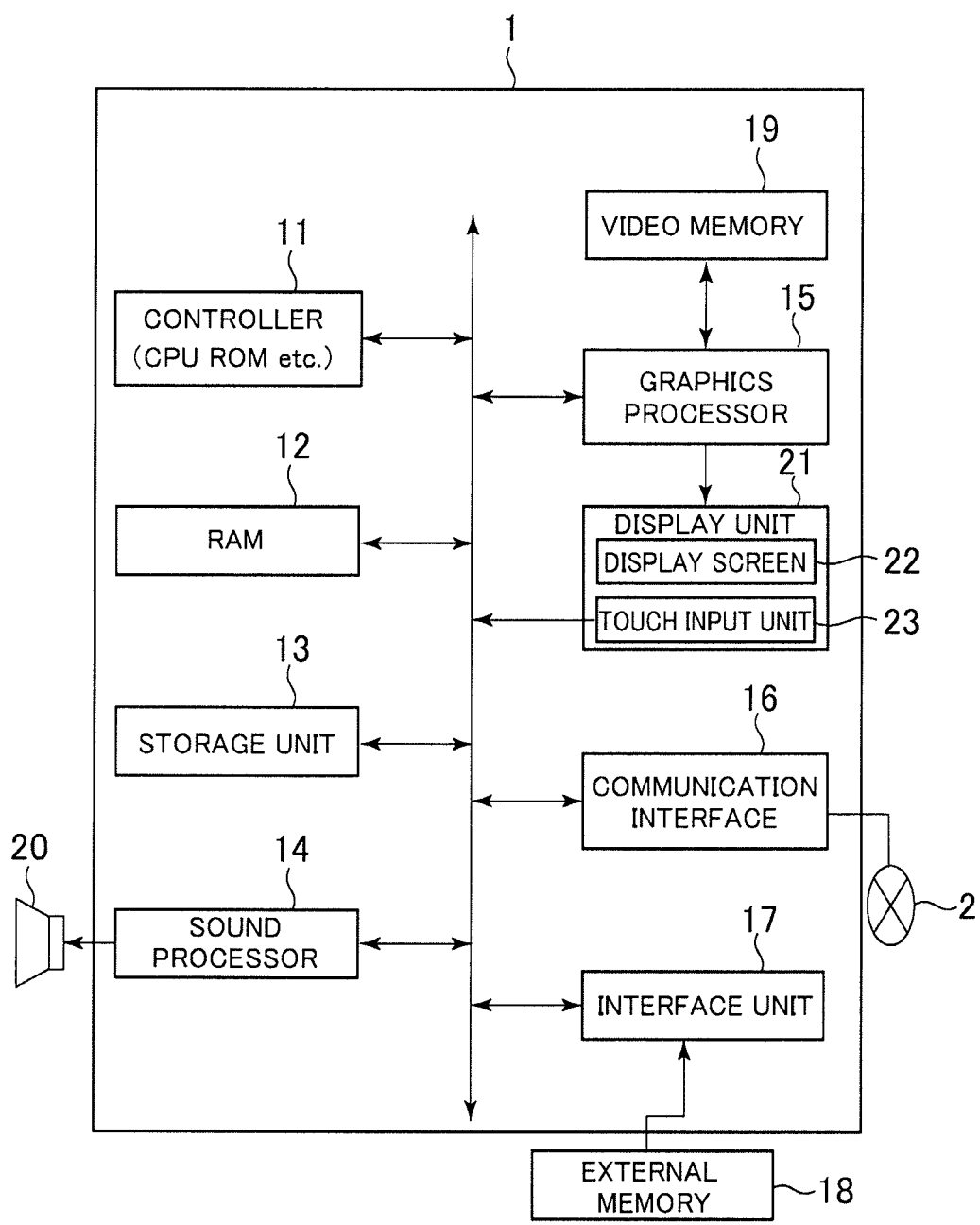
FIG. 5 is a block diagram illustrating a configuration of a computer apparatus, which corresponds to at least one embodiment of the invention.

Next, an outline of a third embodiment of the invention will be described. FIG. 5 is a block diagram illustrating a configuration of a computer apparatus, which corresponds to at least one embodiment of the invention. A computer apparatus 1 includes at least a controller 11, a Random Access Memory (RAM) 12, a storage unit 13, a sound processor 14, a graphics processor 15, a communication interface 16, and an interface unit 17, and these components are connected to each other by an internal bus.

The controller 11 is constituted by a Central Processing Unit (CPU) and a Read Only Memory (ROM). The controller 11 executes a program stored in the storage unit 13, and performs the control of the computer apparatus 1. In addition, the controller 11 includes an internal timer that clocks a time. The RAM 12 is a work area of the controller 11. The storage unit 13 is a storage region for storing programs and data.

The controller 11 reads out the programs and data from the RAM 12 and processes the read-out programs and data. The controller 11 processes the programs and data which are loaded into the RAM 12 to output an instruction for outputting a sound to the sound processor 14 and to output a drawing command to the graphics processor 15.

The sound processor 14 is connected to a sound output device 20 which is a speaker. When the controller 11 outputs the instruction for outputting a sound to the sound processor 14, the sound processor 14 outputs a sound signal to the sound output device 20.

The graphics processor 15 is connected to a display unit 21. The display unit 21 includes a display screen 22 and a touch input unit 23 that receives an input by the user's contact with the display unit. When the controller 11 outputs the drawing command to the graphics processor 15, the graphics processor 15 develops an image to a video memory (frame buffer) 19, and outputs a video signal for displaying the image on the display screen 22.

The touch input unit 23 may be a unit capable of detecting a contact position by using any one method such as a resistive film method, an electrostatic capacitance method, a ultrasonic surface acoustic wave method, an optical method, or an electromagnetic induction method which are used for a touch panel. The touch input unit is a device capable of detecting the position of a finger or the like in a case where an operation such as pressing or movement is performed on the upper surface of the touch input unit 23 by using a finger, a stylus, or the like.

The detection of a position may be the acquisition of coordinates corresponding to a contact position, or may be the acquisition of the length and an angle of a segment connecting a reference position and a contact position to each other. The touch input unit 23 is embedded into the display unit 21, as an example, but may be provided so as to be independent of the display unit 21.

The graphics processor 15 executes drawing of one image in frame units. One frame time of the image is, for example, one thirtieth of a second. The graphics processor 15 has a role of taking charge of a portion of a computational process related to drawing which has been performed by only the controller 11, and distributing a burden of the entire system.

An external memory 18 (for example, an SD card or the like) is connected to the interface unit 17. Data read from the external memory 18 is loaded into the RAM 12, and the computational process is executed by the controller 11.

The communication interface 16 can be connected to a communication network 2 in a wireless or wired manner, and can receive data through the communication network 2. The data received through the communication interface 16 is loaded into the RAM 12, similar to the data read from the external memory 18, and the computational process is performed by the controller 11.

Figure 6:
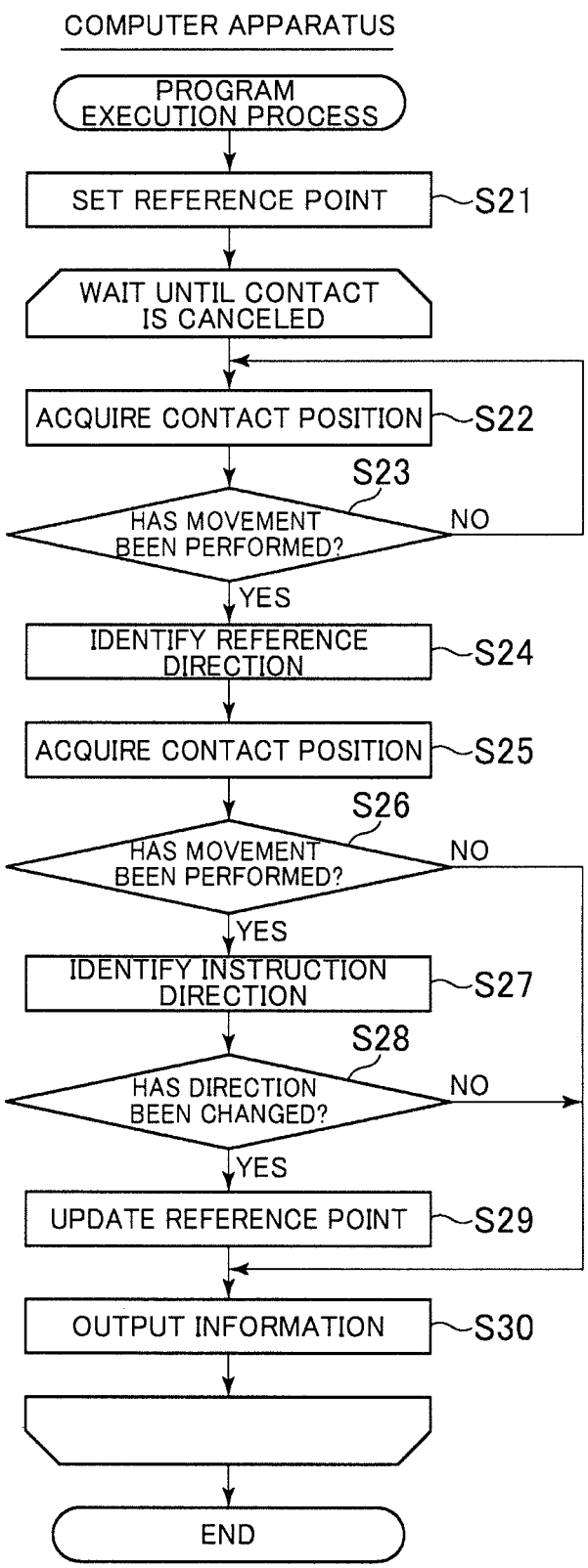
FIG. 6 is a flow chart illustrating a program execution process, which corresponds to at least one embodiment of the invention.

Next, a program execution process in the third embodiment of the invention will be described. FIG. 6 is a flowchart of a program execution process corresponding to at least one embodiment of the invention.

First, when the user performs a contact operation on the touch input unit 23 of the computer apparatus 1 by using a finger or the like, the touch input unit 23 detects a position where a contact is started and sets the detected position as a reference point (step S21).

The reference point is a point to be reference for identifying information, and thus it is preferable that only one point is present at a certain time. In a case where two or more reference points are present, design may be made so as to identify information from the plurality of reference points.

Next, the present contact position is acquired (step S22). A timing when information on the present contact position is acquired may be acquired whenever a predetermined time elapses after the reference point is set in step S21, or may be acquired in a case where movement from the present contact position is performed by a predetermined distance.

It is preferable that the predetermined time for acquiring the information on the present contact position is a multiple of a frame rate in the display unit 21 of the computer apparatus 1. In addition, it is preferable that the predetermined distance is set in consideration of the size of a region where a touch switch detecting a contact in the touch input unit 23 appropriately and effectively functions.

Thereafter, the reference point which is set in step S21 and the contact position acquired in step S22 are compared with each other to determine whether or not movement has been performed (step S23).

Figure 7:
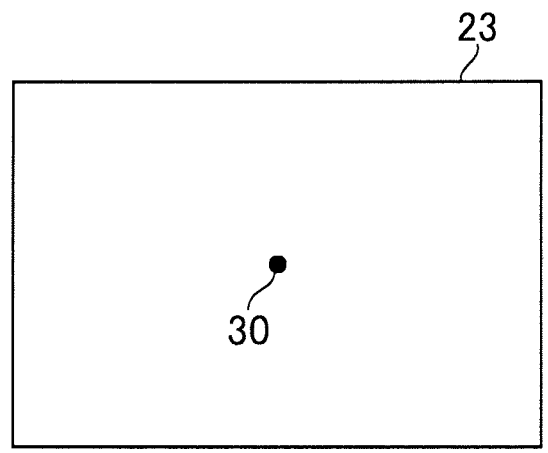
FIGS. 7(a), 7(b) and 7(c) are diagrams illustrating the concept related to determination regarding whether or not movement has been performed, which corresponds to at least one embodiment of the invention.
Figure 7:
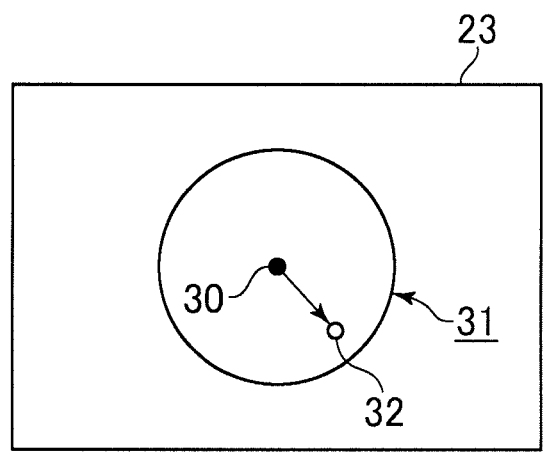
Figure 7:
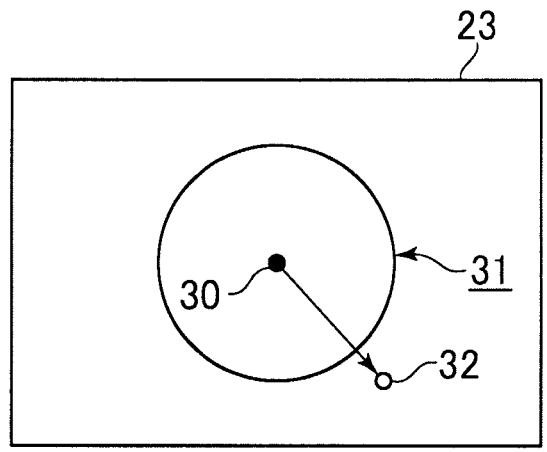

The movement from the reference point will be described with reference to the accompanying drawings. FIG. 7 are diagrams illustrating the concept related to determination regarding whether or not movement has been performed, which corresponds to at least one embodiment of the invention. FIG. 7A illustrates a state where a reference point 30 is set by a user coming into contact with the touch input unit 23 by using a finger or the like.

A case where the user comes into contact with the touch input unit 23 by using a finger or the like and a detected position is different from the reference point 30 is a "moved" state. A state where the detected position is not changed from the reference point 30 is a "non-moving" state.

Incidentally, in a case where the same position cannot be stably detected due to the extension of a contact range of a finger or the like or an increase in the accuracy of detection of the touch input unit 23, a reference point and a contact position may be different from each other even when the user does not intend to perform movement. In this case, in order to accurately acquire the user's operation instruction, a predetermined region (hereinafter, referred to as the same region) for regarding a reference point as indicated in a case of falling within a region may be provided, and it may be recognized that movement has not been performed in a case of not falling outside the same region.

FIG. 7B is a diagram in which a circular same region 31 with the reference point 30 as the center is provided in the touch input unit 23. In a case where a user's contact position has been changed from the reference point 30 to a present contact position 32, the contact position 32 is included in the same region 31, which indicates a "non-moving" state. On the other hand, FIG. 7C illustrates a "moved" state where the present contact position 32 falls outside the same region 31.

In a case where it is determined that movement has been performed (YES in step S23), a direction from the reference point to the contact position acquired in step S22 is identified as a reference direction (step S24). In step S23, in a case where it is determined that movement has not been performed (NO in step S23), the processing is repeatedly executed again from the acquisition of the contact position in step S22.

Subsequently, the present contact position is acquired continuously (step S25). The contact position acquired in step S22 and the contact position acquired in step S25 are compared with each other to determine whether or not movement has been performed (step S26). Regarding the concept related to movement, the same contents as the concept described with reference to FIG. 7 can be adopted.

In a case where it is determined that movement has been performed (YES in step S26), a direction from the contact position acquired in step S22 to the contact position acquired in step S25 is identified as an instruction direction (step S27). In a case where it is determined that movement has not been performed (NO in step S26), information based on the reference direction identified in step S24 is output (step S30).

The case where it is determined in step S26 that movement has not been performed is a case where a contact position is acquired whenever a predetermined time elapses and a case where a contact is stopped and made continuously at the same position without movement after the reference direction is identified in step S24.

The output of the information in step S30 may be the display of characters, a mark, an image, or the like on the display screen 22 included in the display unit 21 of the computer apparatus 1, or may be an output with respect to an external device connected to the interface unit 17. The external device to be assumed may be, for example, a printer, a game machine, or an electronic machine similar thereto.

Next, the reference direction identified in step S24 and the instruction direction identified in step S27 are compared with each other to determine whether or not a direction has been changed (step S28). The change of the direction will be described with reference to the accompanying drawings.

Figure 8:
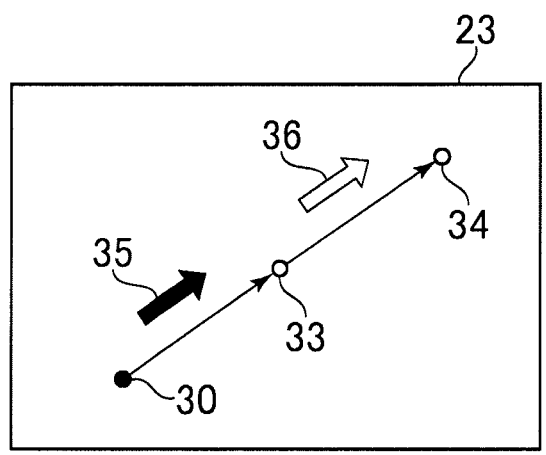
FIGS. 8(a) and 8(b) are diagrams illustrating the concept related to the change of a direction, which corresponds to at least one embodiment of the invention.
Figure 8:
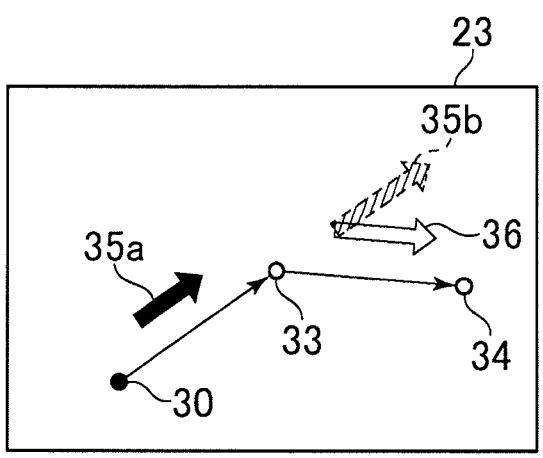

FIG. 8 are diagrams illustrating the concept related to the change of a direction, which corresponds to at least one embodiment of the invention. FIG. 8A is a diagram in which a contact position is moved from the reference point 30 to a contact position 33 in the touch input unit 23, and is further moved from the contact position 33 to a contact position 34 in the same direction from the reference point 30 toward the contact position 33.

First, in a case where the contact position is moved from the reference point 30 to the contact position 33, a reference direction 35 is identified in step S24. Next, when the contact position is further moved from the contact position 33 to the contact position 34, an instruction direction 36 is identified in step S27. The directions of the identified reference direction 35 and instruction direction 36 are compared with each other, and it is determined that "no change is made" in a case where the directions are the same direction.

FIG. 8B is a diagram in which a contact position is moved from the reference point 30 to the contact position 33 in the touch input unit 23, and is further moved from the contact position 33 to the contact position 34 in a direction different from the direction from the reference point 30 toward the contact position 33.

Similarly to FIG. 8A, the contact position is moved from the reference point 30 to the contact position 33 to identify a reference direction 35a. Next, the contact position is further moved from the contact position 33 to the contact position 34 to identify the instruction direction 36. The directions of the identified reference direction 35a and instruction direction 36 are compared with each other, and it is determined that "change is made" because the directions are different from each other.

Here, "the same direction" will be described. The same direction refers to the same orientation in the same coordinate system, and does not include the concept of a distance. A case where the horizontal direction of the touch input unit 23 is set to be a reference line refers to a case where an angle formed by the reference line and a reference direction and an angle formed by the reference line and an instruction direction are consistent with each other.

Figure 9:
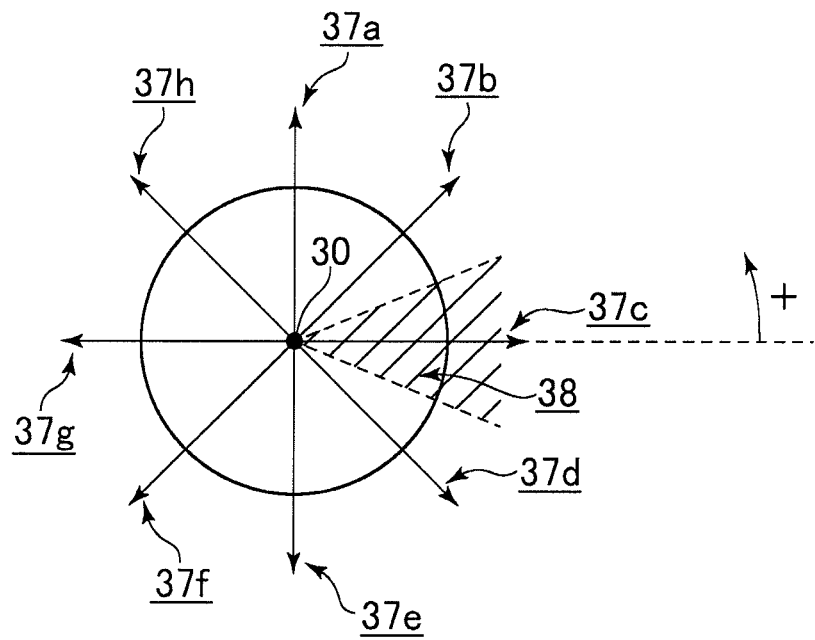
FIGS. 9(a) and 9(b) are diagrams illustrating the concept related to direction assignment for assigning a designated direction, which corresponds to at least one embodiment of the invention.

Incidentally, in the designation of a direction which is performed by moving a contact position by a user, design may be made so that the designated direction is assigned to any one of a plurality of directions which are set in advance even when completely the same direction is not designated, and consequently, it can also be determined that the same direction is designated. FIG. 9 are diagrams illustrating the concept related to direction assignment for assigning a designated direction, which corresponds to at least one embodiment of the invention.

FIG. 9A is a diagram illustrating a state where eight directions are set as operable directions in advance with the reference point 30 as the center. Eight segments 37 extending from the reference point 30 represent operable directions which are set in advance. An angle formed by the segments 37 is 45 degrees.

Next, the assignment of a direction will be described. An angle in a predetermined range is set for a direction to be assigned. FIG. 9B is a diagram regarding an assignment setting table of assignment directions and ranges of corresponding angles. In an assignment setting table 40, an angle lower limit 42 and an angle upper limit 43 are stored in association with an assignment direction 41. The angle lower limit 42 and the angle upper limit 43 respectively represent a lower limit and an upper limit of an angle in a range corresponding to the assignment direction 41. Meanwhile, as an example, the direction of a segment 37c indicating a horizontal right direction from the reference point 30 is set to be 0 degrees. Regarding an angle, a counterclockwise direction is represented as a positive direction, but the invention is not limited thereto.

For example, in order to perform assignment in the right direction, a contact position moved from the reference point 30 needs to be moved in a direction within a range (a hatched portion 38 in FIG. 9A) between −22.5 degrees and 22.5 degrees (between 0 degrees and 22.5 degrees or between 337.5 degrees and 360 degrees).

As the assignment of a direction, an operation instruction may be input in the vertical direction or the horizontal direction on the display screen 22 by assigning cross keys of a virtual controller which include up, down, right, and left direction keys, for example, with a reference point as the center.

In the assignment setting table 40, an angle of 360 degrees is equally assigned with respect to an assignment direction. However, an angle to be assigned may be assigned unequally, or an assignment direction may be set so as not to be associated with ranges of some angles.

Referring back to the flowchart of FIG. 6, the reference direction identified in step S24 and the instruction direction identified in step S27 are compared with each other to determine whether or not a direction has been changed (step S28).

In a case where it is determined that a direction has been changed (YES in step S28), the reference point is updated (step S29). The update of the reference point refers to the update of the reference point 30 to the position of the contact position 33 in a case where it is determined that a moving direction has been changed, for example, in the state illustrated in FIG. 8B.

After the reference point is updated, information based on the instruction direction identified in step S27 is output (step S30).

In a case where it is determined that a direction has not been changed (NO in step S28), information based on the instruction direction identified in step S27 is output (step S30).

The processing from step S22 to step S30 is repeatedly executed until the user's contact with the operation unit is canceled, and the processing is terminated when the contact is canceled.

In the third embodiment, the output of the information is stopped in a case where the user's contact with the touch input unit 23 is canceled. That is, at least the reference direction, the instruction direction, and the reference point which are set are updated to a state where the user's contact with the touch input unit 23 has not been made. In a case where the user starts to come into contact with the touch input unit 23 again, any one new contact position is set as a reference point.

As an aspect of the third embodiment, a first point in a case where the present contact position is set to be a second point is updated as a reference point in a case where it is determined that a direction has been changed, and thus it is possible to continuously operate a virtual controller without separating a finger or the like from the screen, to enable an intuitive operation in which the movement of the finger or the like and an input direction correspond to each other, and to reduce an operation burden on the user.

As an aspect of the third embodiment, a direction designated by the user is assigned to an operation direction which is set in advance, and thus the user's direction instruction operation is simplified and an intuitive operation can be performed.

As an aspect of the third embodiment, information based on a direction identified during the movement of a contact position is output in a case where the movement of the contact position is stopped after the contact position is moved from a reference point. Thereby, an unnecessary operation, such as continuous movement of the contact position, does not need to be performed, and an operation burden can be reduced.

As an aspect of the third embodiment, a position where a contact with the operation unit is started is set as a reference point, and thus the user can set a virtual controller at any point. Thereby, it is possible to provide an interface having excellent user convenience.

As an aspect of the third embodiment, the output of information is stopped in a case where a contact with the operation unit is canceled, and thus it is possible to stop inputting an operation instruction by a simple operation and to provide the same operation feeling as that of a controller in the related art while enabling an intuitive operation.

As an aspect of the third embodiment, any one new contact position is set as a reference point in a case where a contact with the operation unit is started by the user after a contact with the operation unit is canceled, and thus it is possible to perform an intuitive operation without minding an input based on the previous contact.

As an aspect of the third embodiment, the user can perform an intuitive operation, and consequently, an operation can be performed without displaying a virtual controller on a display screen by the above-described features. Therefore, it is possible to provide a user interface preventing a field of view from being narrowed due to the virtual controller.

In the third embodiment, each of the "operation unit", the "computer apparatus", the "reference point", the "movement of contact position", the "direction", the "change of direction", the "determination", the "update", and the "information" has the same contents as those described in the first embodiment.

In the third embodiment, the "stop of movement" means that, for example, it is determined that a contact position which has been moved is not moved at the same position. The "cancellation of contact" means that, for example, a finger or the like which has been in contact with the operation unit is separated from the operation unit.

Fourth Embodiment

Figure 10:
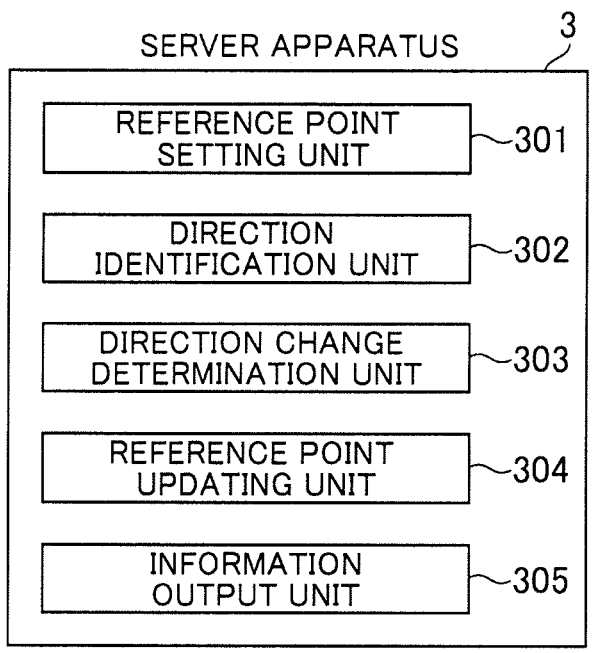
FIG. 10 is a block diagram illustrating a configuration of a server apparatus, which corresponds to at least one embodiment of the invention.

Next, an outline of a fourth embodiment of the invention will be described. FIG. 10 is a block diagram illustrating a configuration of a server apparatus, which corresponds to at least one embodiment of the invention. A server apparatus 3 includes at least a reference point setting unit 301, a direction identification unit 302, a direction change determination unit 303, a reference point updating unit 304, and an information output unit 305.

The reference point setting unit 301 has a function of setting a user's any one contact position on an operation unit as a reference point. The direction identification unit 302 has a function of identifying a direction of a second point with respect to a first point when the contact position before the elapse of a predetermined period is defined as the first point and the contact position after the elapse of the predetermined period is defined as the second point in a case where the contact position is moved, or when the contact position before movement at a predetermined distance is defined as the first point and the contact position after movement at the predetermined distance is defined as the second point in a case where the contact position is moved.

The direction change determination unit 303 has a function of determining whether or not the direction has been changed by comparing a first direction and a second direction with each other, when the direction identified by the direction identification unit 302 is defined as the first direction in a case where the first point is a reference point, and the direction identified by the direction identification unit 302 is defined as the second direction in a case where the present contact position is set to be the second point.

The reference point updating unit 304 has a function of updating the first point in a case where the present contact position is set to be the second point, as a reference point in a case where the direction change determination unit 303 determines that the direction has been changed. The information output unit 305 has a function of outputting information based on the direction identified by the direction identification unit 302.

Figure 11:
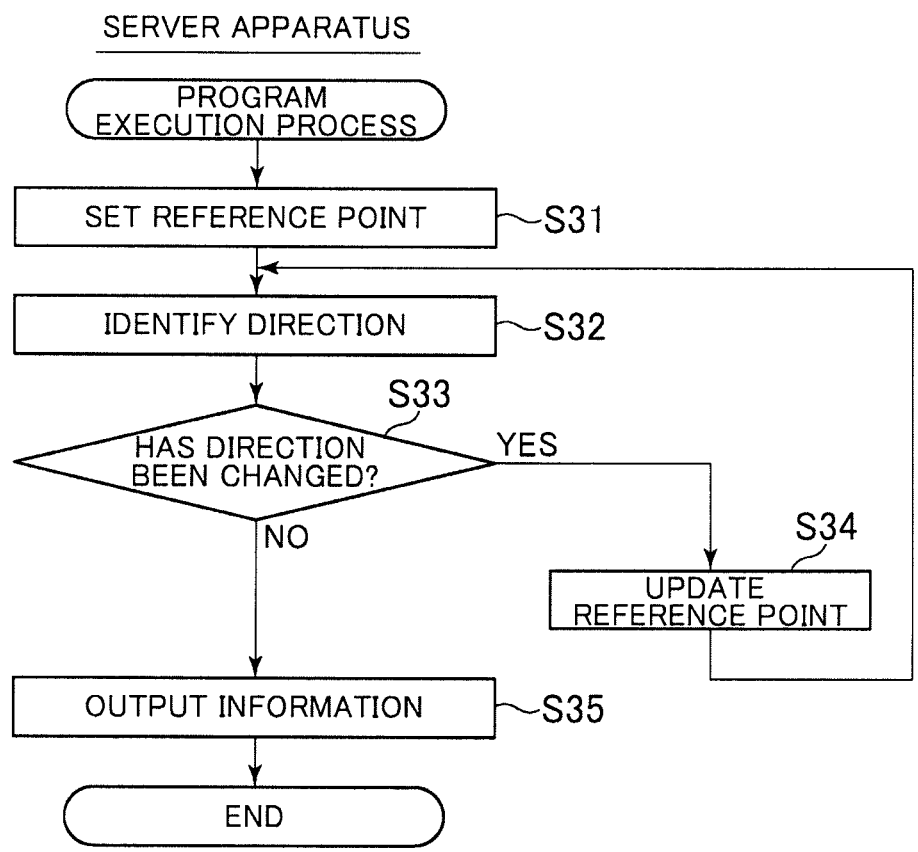
FIG. 11 is a flowchart of the program execution process corresponding to at least one embodiment of the invention.

A program execution process in the fourth embodiment of the invention will be described. FIG. 11 is a flowchart of the program execution process corresponding to at least one embodiment of the invention.

The server apparatus 3 sets the user's any one contact position on the operation unit as a reference point (step S31). A direction of a second point with respect to a first point is identified when the contact position before the elapse of a predetermined period is defined as the first point and the contact position after the elapse of the predetermined period is defined as the second point in a case where the contact position is moved, or when the contact position before movement at a predetermined distance is defined as the first point and the contact position after movement at the predetermined distance is defined as the second point in a case where the contact position is moved (step S32).

It is determined whether or not the direction has been changed by comparing a first direction and a second direction with each other, when the direction identified by the direction identification unit 302 is defined as the first direction in a case where the first point is a reference point, and the direction identified by the direction identification unit 302 is defined as the second direction in a case where the present contact position is set to be the second point (step S33). In step S33, in a case where it is determined that the direction has been changed (YES in step S33), the first point in a case where the present contact position is set to be the second point is updated as a reference point (step S34).

Information based on the direction identified by the direction identification unit 302 is output (step S35), and the program execution process is terminated.

In a case where the reference point is updated by the reference point updating unit 304, the identification of the direction in step S32, the determination of the change of the direction in step S33, the update of the reference point in step S34, and the output of the information in step S35 are executed on the basis of the updated reference point.

As an aspect of the fourth embodiment, it is not necessary to separate a finger or the like from the screen once and bring the finger or the like into contact with the virtual controller again when attempting to change a direction to be input, and thus it is possible to enable an intuitive operation and reduce an operation burden on a user.

In the fourth embodiment, each of the "operation unit", the "computer apparatus", the "reference point", the "movement of contact position", the "direction", the "change of direction", the "determination", the "update", and the "information" has the same contents as those described in the first embodiment.

Fifth Embodiment

Figure 12:
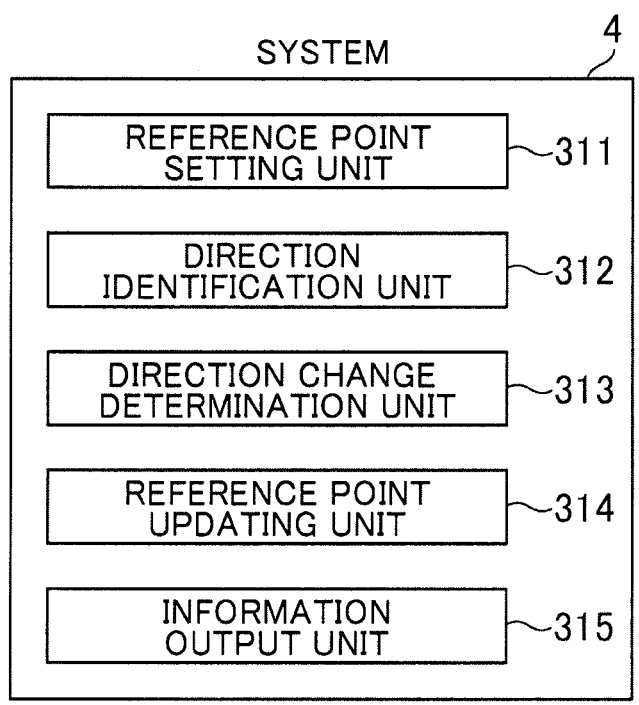
FIG. 12 is a block diagram illustrating a configuration of a system, which corresponds to at least one embodiment of the invention.

Next, an outline of a fifth embodiment of the invention will be described. FIG. 12 is a block diagram illustrating a configuration of a system, which corresponds to at least one embodiment of the invention. A system 4 includes at least a reference point setting unit 311, a direction identification unit 312, a direction change determination unit 313, a reference point updating unit 314, and an information output unit 315.

The reference point setting unit 311 has a function of setting a user's any one contact position on an operation unit as a reference point. The direction identification unit 312 has a function of identifying a direction of a second point with respect to a first point when the contact position before the elapse of a predetermined period is defined as the first point and the contact position after the elapse of the predetermined period is defined as the second point in a case where the contact position is moved, or when the contact position before movement at a predetermined distance is defined as the first point and the contact position after movement at the predetermined distance is defined as the second point in a case where the contact position is moved.

The direction change determination unit 313 has a function of determining whether or not the direction has been changed by comparing a first direction and a second direction with each other, when the direction identified by the direction identification unit 312 is defined as the first direction in a case where the first point is a reference point, and the direction identified by the direction identification unit 312 is defined as the second direction in a case where the present contact position is set to be the second point.

The reference point updating unit 314 has a function of updating the first point when the present contact position is set to be the second point, as a reference point in a case where the direction change determination unit 313 determines that the direction has been changed. The information output unit 315 has a function of outputting information based on the direction identified by the direction identification unit 312.

Figure 13:
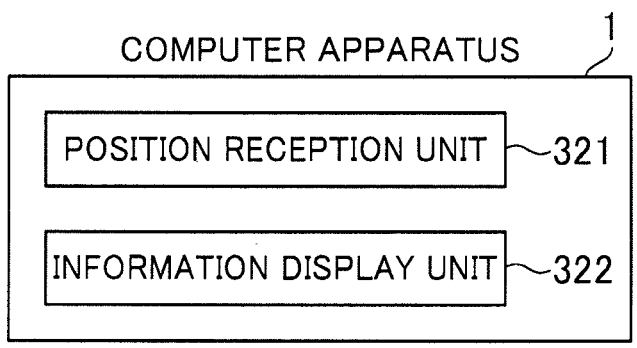
FIG. 13 is a block diagram illustrating a configuration of a computer apparatus, which corresponds to at least one embodiment of the invention.

FIG. 13 is a block diagram illustrating a configuration of a computer apparatus, which corresponds to at least one embodiment of the invention. A computer apparatus 1 includes at least a position reception unit 316 and an information display unit 317.

The position reception unit 316 has a function of receiving the user's contact position on an operation unit as a contact position. The information display unit 317 has a function of displaying the output information.

Figure 14:
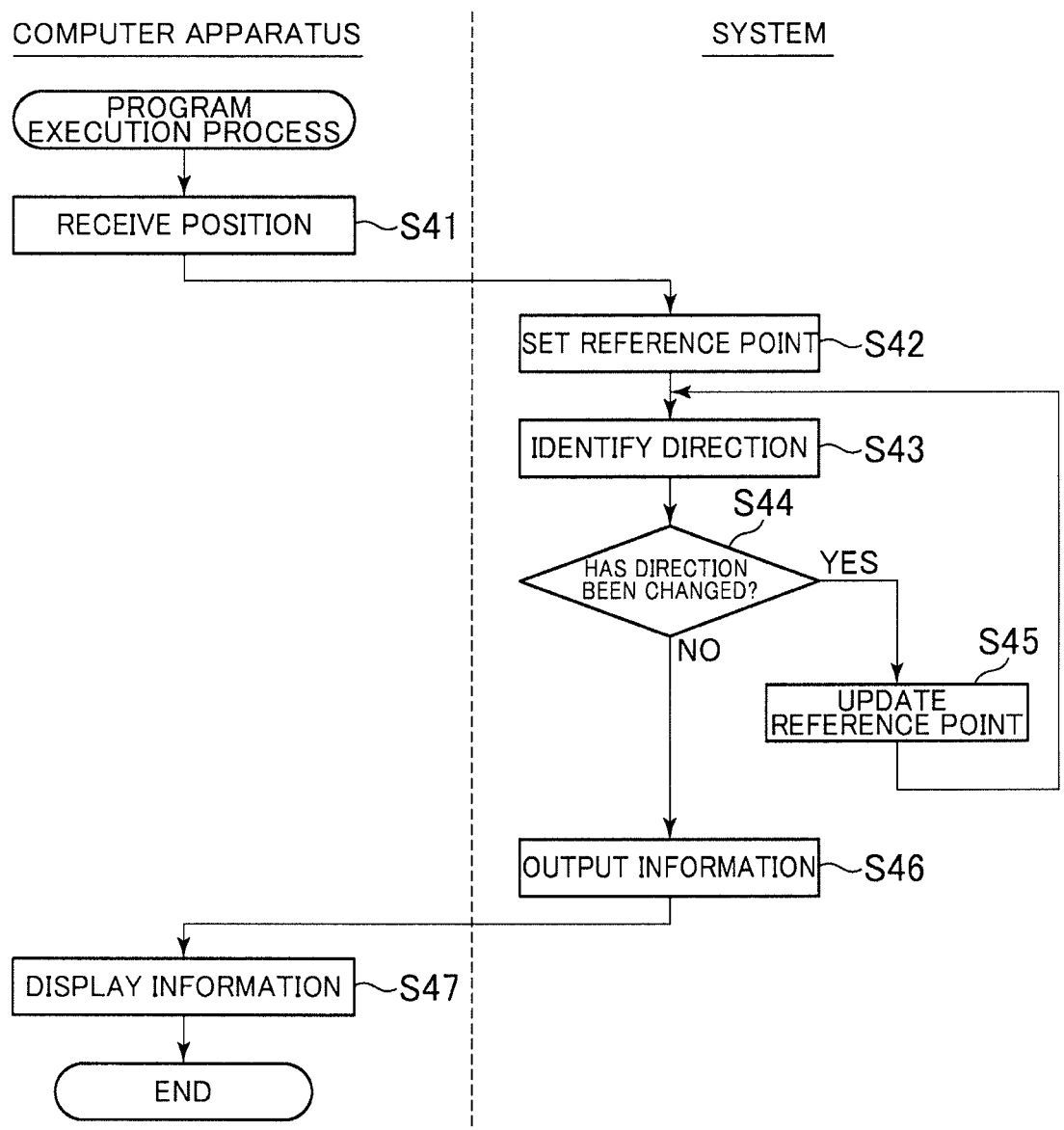
FIG. 14 is a flowchart of the program execution process, which corresponds to at least one embodiment of the invention.

A program execution process in the fifth embodiment of the invention will be described. FIG. 14 is a flowchart of the program execution process, which corresponds to at least one embodiment of the invention.

First, the computer apparatus 1 receives the user's contact position on an operation unit as a contact position (step S41).

Next, the system 4 sets the user's any one contact position on the operation unit as a reference point (step S42). A direction of a second point with respect to a first point is identified when the contact position before the elapse of a predetermined period is defined as the first point and the contact position after the elapse of the predetermined period is defined as the second point in a case where the contact position is moved, or when the contact position before movement at a predetermined distance is defined as the first point and the contact position after movement at the predetermined distance is defined as the second point in a case where the contact position is moved (step S43).

It is determined whether or not the direction has been changed by comparing a first direction and a second direction with each other, when the direction identified by the direction identification unit 312 is defined as the first direction in a case where the first point is a reference point, and the direction identified by the direction identification unit 312 is defined as the second direction in a case where the present contact position is set to be the second point (step S44). In step S44, in a case where it is determined that the direction has been changed (YES in step S44), the first point in a case where the present contact position is set to be the second point is updated as a reference point (step S45), and information based on the direction identified by the direction identification unit 312 is output (step S46).

Subsequently, the computer apparatus 1 displays the information which is output by the system 4 (step S47), and the program execution process is terminated.

In the fifth embodiment, in a case where the reference point is updated by the reference point updating unit 314, the identification of the direction in step S43, the determination of the change of the direction in step S44, the update of the reference point in step S45, and the output of the information in step S46 are executed on the basis of the updated reference point.

As an aspect of the fifth embodiment, it is not necessary to separate a finger or the like from the screen once and bring the finger or the like into contact with the virtual controller again when attempting to change a direction to be input, and thus it is possible to enable an intuitive operation and reduce an operation burden on a user.

In the fifth embodiment, each of the "operation unit", the "computer apparatus", the "reference point", the "movement of contact position", the "direction", the "change of direction", the "determination", the "update", and the "information" has the same contents as those described in the first embodiment.

In the fifth embodiment, the "display" means that, for example, information is shown so as to be visually perceived.

Sixth Embodiment

Next, an outline of a sixth embodiment of the invention will be described. As a configuration of a computer apparatus in the sixth embodiment, the same configuration as that illustrated in the block diagram of FIG. 13 can be adopted.

Figure 15:
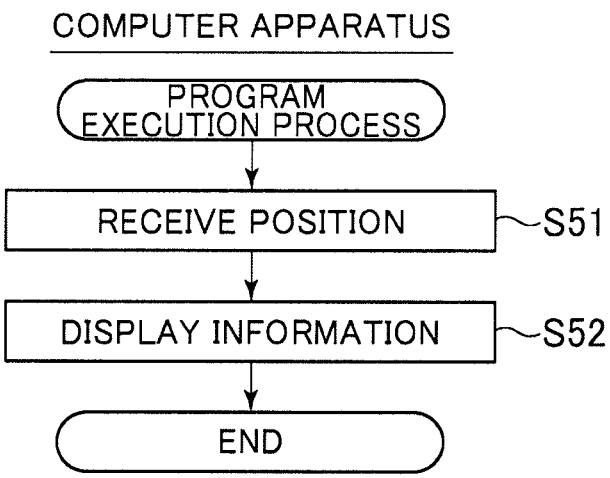
FIG. 15 is a flowchart of the program execution process, which corresponds to at least one embodiment of the invention.

A program execution process in the sixth embodiment of the invention will be described. FIG. 15 is a flowchart of the program execution process, which corresponds to at least one embodiment of the invention.

A computer apparatus 1 receives a user's contact position on an operation unit as a contact position (step S51). Output information is displayed (step S52), and the program execution process is terminated.

In the sixth embodiment, a server apparatus functions as a reference point setter that sets the user's any one contact position on the operation unit as a reference point, a direction identificator that identifies a direction of a second point with respect to a first point when the contact position before the elapse of a predetermined period is defined as the first point and the contact position after the elapse of the predetermined period is defined as the second point in a case where the contact position is moved, or when the contact position before movement at a predetermined distance is defined as the first point and the contact position after movement at the predetermined distance is defined as the second point in a case where the contact position is moved, a direction change determinator that determines whether or not the direction has been changed by comparing a first direction and a second direction with each other when the direction identified by the direction identificator is defined as the first direction in a case where the first point is a reference point and the direction identified by the direction identificator is defined as the second direction in a case where the present contact position is set to be the second point, a reference point updator that updates the first point when the present contact position is set to be the second point, as a reference point in a case where it is determined that the direction has been changed, and an information outputter that outputs information based on the direction identified by the direction identificator.

In the sixth embodiment, in a case where the reference point has been updated by the reference point updator, the direction identificator, the direction change determinator, the reference point updator, and the information outputter are executed on the basis of the updated reference point.

As an aspect of the sixth embodiment, it is not necessary to separate a finger or the like from the screen once and bring the finger or the like into contact with the virtual controller again when attempting to change a direction to be input, and thus it is possible to enable an intuitive operation and reduce an operation burden on a user.

In the sixth embodiment, each of the "operation unit", the "computer apparatus", the "reference point", the "movement of contact position", the "direction", the "change of direction", the "determination", the "update", and the "information" has the same contents as those described in the first embodiment. In addition, the "display" has the same contents as those described in the fifth embodiment.

Seventh Embodiment

Figure 16:
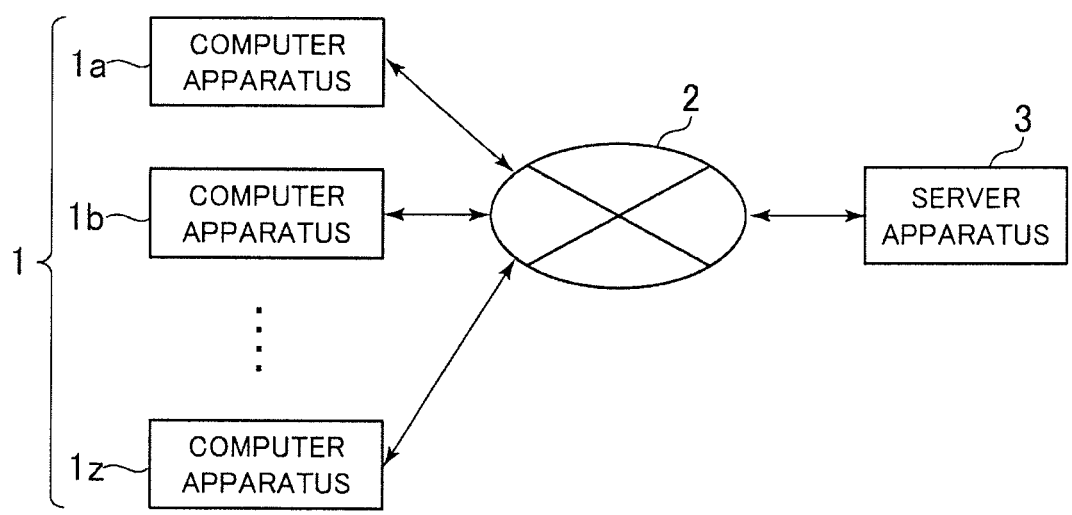
FIG. 16 is a block diagram illustrating a configuration of a system, which corresponds to at least one embodiment of the invention.

Next, an outline of a seventh embodiment of the invention will be described. FIG. 16 is a block diagram illustrating a configuration of a system, which corresponds to at least one embodiment of the invention. As illustrated in the drawing, the system is constituted by a plurality of computer apparatuses 1 (computer apparatuses 1a, 1b, . . . , and 1z) which are operated by a plurality of users (users A, B, . . . , Z), a server apparatus 3, and a communication network 2. The computer apparatus 1 is connected to the server apparatus 3 through the communication network 2. Meanwhile, the computer apparatus 1 may not be connected to the server apparatus 3 at all times, or may be connected thereto as necessary.

As a configuration of the computer apparatus in the seventh embodiment, the same configuration as that illustrated in the block diagram of FIG. 5 can be adopted.

Figure 17:
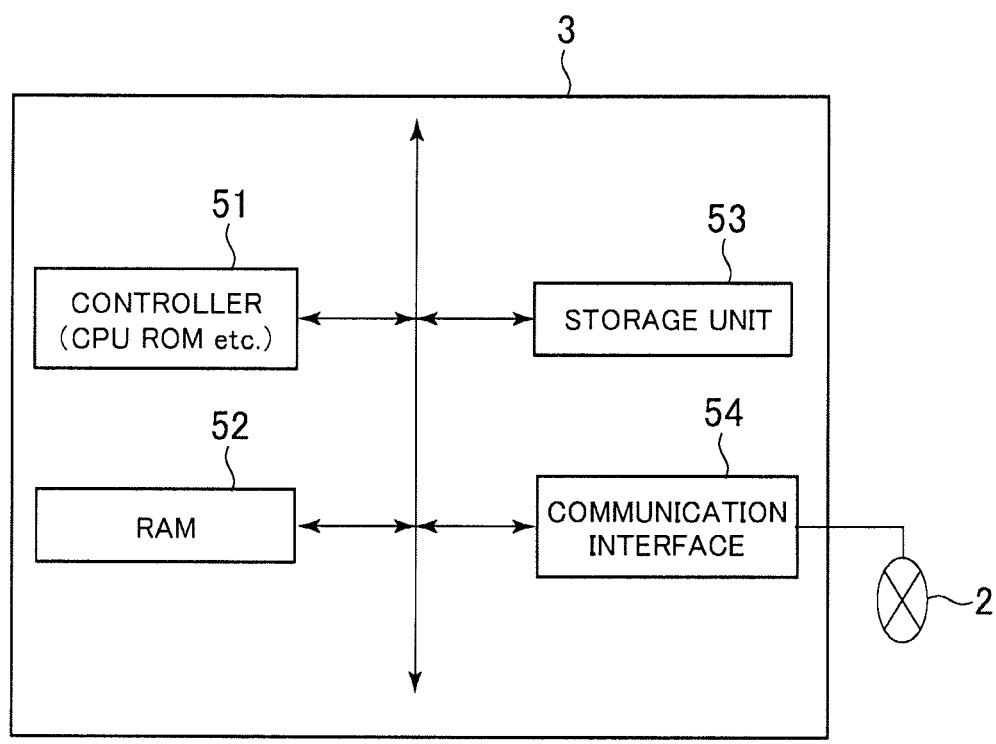
FIG. 17 is a block diagram illustrating a configuration of a server apparatus, which corresponds to at least one embodiment of the invention.

FIG. 17 is a block diagram illustrating a configuration of a server apparatus, which corresponds to at least one embodiment of the invention. The server apparatus 3 includes a controller 51, a RAM 52, a storage unit 53, and a communication interface 54, and these components are connected to each other by an internal bus.

The controller 51 is constituted by a CPU and a ROM, executes a program stored in the storage unit 53, and performs the control of the server apparatus 3. In addition, the controller 51 includes an internal timer that clocks a time. The RAM 52 is a work area of the controller 51. The storage unit 53 is a storage region for storing programs and data. The controller 51 reads out the programs and data from the RAM 52, and performs a program execution process on the basis of request information received from the computer apparatus 1.

Figure 18:
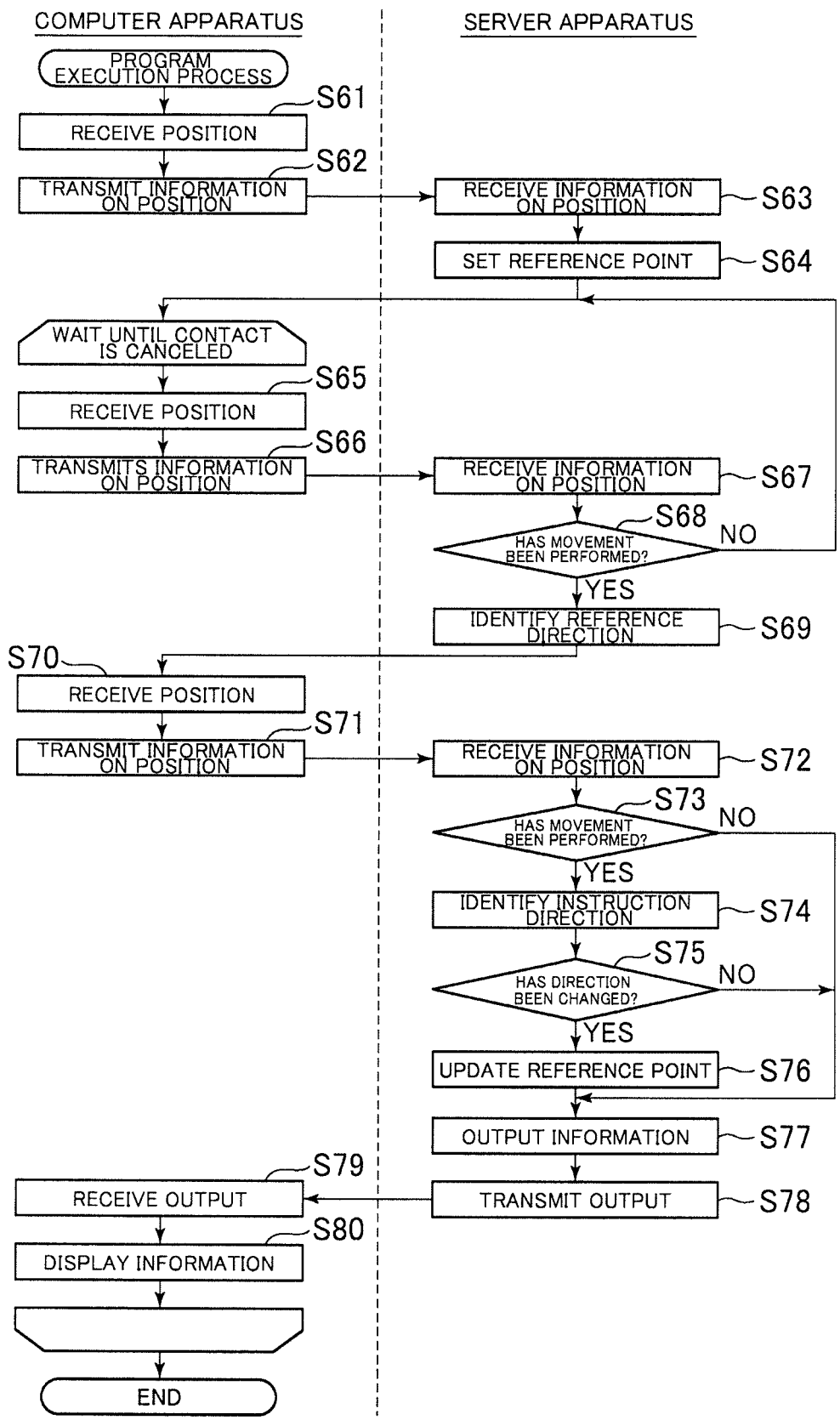
FIG. 18 is a flowchart of the program execution process, which corresponds to at least one embodiment of the invention.

Next, a program execution process in the seventh embodiment of the invention will be described. FIG. 18 is a flowchart of the program execution process, which corresponds to at least one embodiment of the invention.

When a user performs a contact operation on a touch input unit 23 of the computer apparatus 1 by using a finger or the like, the touch input unit 23 detects and receives a position where a contact is started (step S61). Next, the computer apparatus 1 transmits information on the received position to the server apparatus 3 (step S62).

The server apparatus 3 receives the information on the position from the computer apparatus 1 (step S63). The received position is set as a reference point (step S64). The server apparatus 3 waits until the next input (designation of a position) is received from the computer apparatus 1.

The reference point is a point to be reference for identifying information, and thus it is preferable that only one point is present at a certain time. In a case where two or more reference points are present, design may be made so as to identify information from the plurality of reference points.

The computer apparatus 1 further receives an operation instruction with respect to the touch input unit 23 from the user (step S65). The information on the received position is transmitted to the server apparatus 3 (step S66).

A timing when information on the present contact position is acquired may be acquired whenever a predetermined time elapses after the position is received in step S61, or may be acquired in a case where movement from the present contact position is performed by a predetermined distance.

It is preferable that the predetermined time for acquiring the information on the present contact position is a multiple of a frame rate in a display unit 21 of the computer apparatus 1. In addition, it is preferable that the predetermined distance is set in consideration of the size of a region where a touch switch detecting a contact in the touch input unit 23 appropriately and effectively functions.

The server apparatus 3 receives the information on the position from the computer apparatus 1 again (step S67). Thereafter, the reference point which is set in step S64 and the position received in step S67 are compared with each other to determine whether or not movement has been performed (step S68). Regarding the concept related to determination of whether or not movement has been performed, the same contents as the concept described with reference to FIG. 7 can be adopted.

In a case where it is determined that movement has been performed (YES in step S68), a direction from the reference point to the position received in step S67 is identified as a reference direction (step S69). In step S68, in a case where movement has not been performed (NO in step S68), it is waited until the next input (designation of a position) is received from the computer apparatus 1 again.

Subsequently, the computer apparatus 1 continuously receives the user's present contact position (step S70), and transmits information on the received position to the server apparatus 3 (step S71).

The server apparatus 3 receives the information on the position (step S72). Further, the position received in step S67 and the position received in step S72 are compared with each other to determine whether or not movement has been performed (step S73). Regarding the concept related to determination of whether or not movement has been performed, the same contents as the concept described with reference to FIG. 7 can be adopted.

In a case where it is determined that movement has been performed (YES in step S73), a direction from the position received in step S67 to the position received in step S72 is identified as an instruction direction (step S74). In a case where movement has not been performed (NO in step S73), information based on the reference direction identified in step S69 is output (step S77).

Meanwhile, the identified direction may be assigned to any one of a plurality of set directions which are set in advance, in accordance with the direction. Regarding the assignment of a direction, the contents described with reference to FIG. 9 can be adopted.

Next, the reference direction identified in step S69 and the instruction direction identified in step S74 are compared with each other to determine whether or not a direction has been changed (step S75). Regarding the change of a direction, the contents described with reference to FIG. 8 can be adopted.

The reference direction identified in step S69 and the instruction direction identified in step S74 are compared with each other to determine whether or not a direction has been changed (step S75). In a case where it is determined that a direction has been changed (YES in step S75), the reference point is updated (step S76). The update of the reference point refers to the update of the reference point 30 to the position of the contact position 33 in a case where it is determined that a moving direction has been changed, for example, in the state illustrated in FIG. 8B.

After the reference point is updated, information based on the instruction direction identified in step S74 is output (step S77).

In a case where it is determined that a direction has not been changed (NO in step S75), information based on the instruction direction identified in step S74 is output (step S77).

The server apparatus 3 transmits the information which is output in step S77 to the computer apparatus 1 (step S78). The computer apparatus 1 receives the transmitted information (step S79), and displays the information on a display screen 22 of the display unit 21 (step S80).

The processing from step S65 to step S80 is repeatedly executed until the user's contact with the operation unit is canceled, and the processing is terminated when the contact is canceled.

In the seventh embodiment, the computer apparatus 1 transmits information by which it can be determined that the user's contact with the touch input unit 23 has been canceled, to the server apparatus 3 in a case where the contact has been canceled. The server apparatus 3 receives the information and stops outputting the information. That is, at least the reference direction, the instruction direction, and the reference point which are set are updated to a state where the user's contact with the touch input unit 23 has not been made. In a case where the user starts to come into contact with the touch input unit 23 again, any one new contact position is set as a reference point.

In the seventh embodiment, the system is constituted by the computer apparatus 1 and the server apparatus 3, but is not limited to the above-described embodiments. For example, the functions of the server apparatus 3 can be substituted by the computer apparatus 1 as a system constituted by only a plurality of computer apparatuses 1, without using the server apparatus 3.

In the seventh embodiment, the subject of each process is not limited to the above-described configurations. That is, some of the processes performed by the server apparatus 3 may be performed by the computer apparatus 1 in consideration of a communication load, acquisition easiness of information, and the like.

As an aspect of the seventh embodiment, a first point when the present contact position is set to be a second point is updated as a reference point in a case where it is determined that a direction has been changed, and thus it is possible to continuously operate a virtual controller without separating a finger or the like from the screen, to enable an intuitive operation in which the movement of the finger or the like and an input direction correspond to each other, and to reduce an operation burden on the user.

As an aspect of the seventh embodiment, a direction designated by the user is assigned to an operation direction which is set in advance, and thus the user's direction instruction operation is simplified and an intuitive operation can be performed.

As an aspect of the seventh embodiment, information based on a direction identified during the movement of a contact position is output in a case where the movement of the contact position is stopped after the contact position is moved from a reference point. Thereby, an unnecessary operation, such as continuous movement of the contact position, does not need to be performed, and an operation burden can be reduced.

As an aspect of the seventh embodiment, a position where a contact with the operation unit is started is set as a reference point, and thus the user can set a virtual controller at any point. Thereby, it is possible to provide an interface having excellent user convenience.

As an aspect of the seventh embodiment, the output of information is stopped in a case where a contact with the operation unit is canceled, and thus it is possible to stop inputting an operation instruction by a simple operation and to provide the same operation feeling as that of a controller in the related art while enabling an intuitive operation.

As an aspect of the seventh embodiment, any one new contact position is set as a reference point in a case where a contact with the operation unit is started by the user after a contact with the operation unit is canceled, and thus it is possible to perform an intuitive operation without minding an input based on the previous contact.

In the seventh embodiment, each of the "operation unit", the "computer apparatus", the "reference point", the "movement of contact position", the "direction", the "change of direction", the "determination", the "update", and the "information" has the same contents as those described in the first embodiment.

In the seventh embodiment, each of the "stop of movement" and the "cancellation of contact" has the same contents as those described in the third embodiment. In addition, the "display" has the same contents as those described in the fifth embodiment.

Eighth Embodiment

Figure 19:
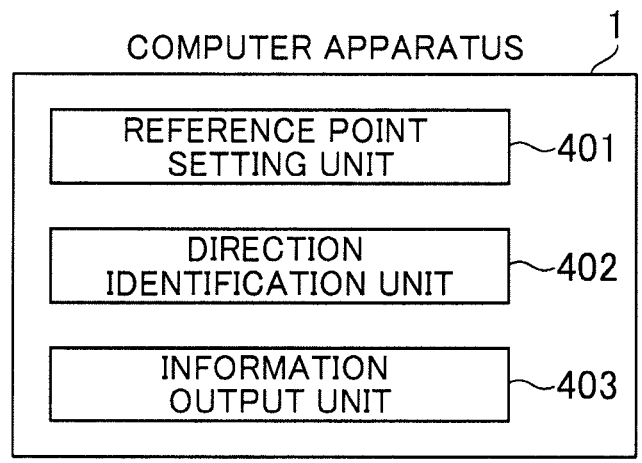
FIG. 19 is a block diagram illustrating a configuration of a computer apparatus, which corresponds to at least one embodiment of the invention.

Next, an outline of an eighth embodiment of the invention will be described. FIG. 19 is a block diagram illustrating a configuration of a computer apparatus, which corresponds to at least one embodiment of the invention. A computer apparatus 1 includes at least a reference point setting unit 401, a direction identification unit 402, and an information output unit 403.

The reference point setting unit 401 has a function of setting a user's contact position on an operation unit as a reference point, for each predetermined period or whenever the contact position is moved at a predetermined distance. The direction identification unit 402 has a function of identifying the direction of the contact position with respect to the reference point, for each predetermined period or whenever the contact position is moved at a predetermined distance. The information output unit 403 has a function of outputting information based on the direction identified by the direction identification unit 402.

Figure 20:
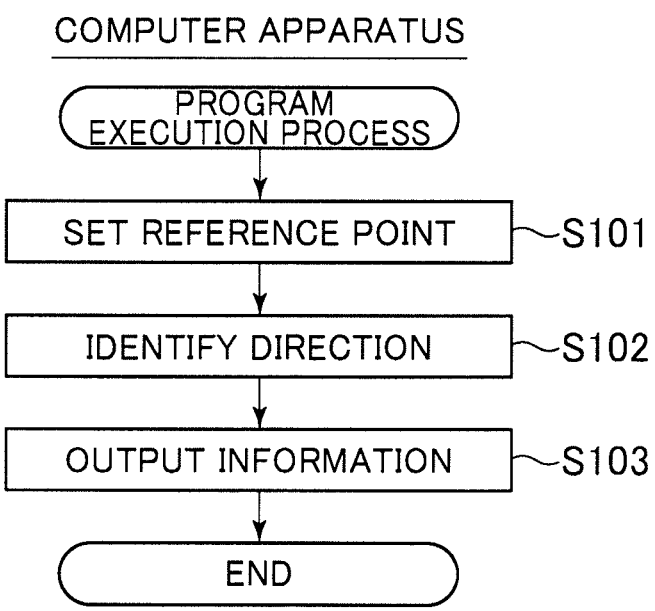
FIG. 20 is a flowchart of the program execution process, which corresponds to at least one embodiment of the invention.

A program execution process in the eighth embodiment of the invention will be described. FIG. 20 is a flowchart of the program execution process, which corresponds to at least one embodiment of the invention.

The computer apparatus 1 sets the user's contact position on the operation unit as a reference point, for each predetermined period or whenever the contact position is moved at a predetermined distance (step S101). Next, the direction of the contact position with respect to the reference point is identified for each predetermined period or whenever the contact position is moved at a predetermined distance (step S102). Information based on the direction identified by the direction identification unit 402 is output (step S103), and the program execution process is terminated.

As an aspect of the eighth embodiment, it is possible to enable an intuitive operation and reduce an operation burden on the user.

In the eighth embodiment, each of the "operation unit", the "computer apparatus", the "reference point", the "movement of contact position", the "direction", and the "information" has the same contents as those described in the first embodiment.

Ninth Embodiment

Figure 21:
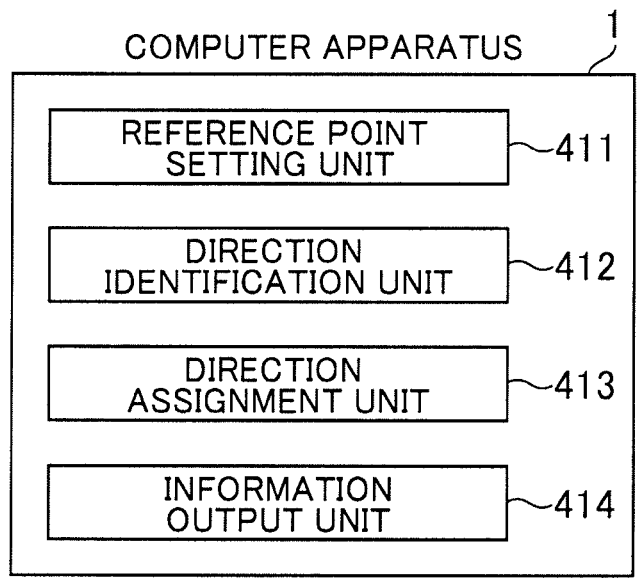
FIG. 21 is a block diagram illustrating a configuration of a computer apparatus, which corresponds to at least one embodiment of the invention.

Next, an outline of a ninth embodiment of the invention will be described. FIG. 21 is a block diagram illustrating a configuration of a computer apparatus, which corresponds to at least one embodiment of the invention. A computer apparatus 1 includes at least a reference point setting unit 411, a direction identification unit 412, a direction assignment unit 413, and an information output unit 414.

The reference point setting unit 411 has a function of setting a user's contact position on an operation unit as a reference point, for each predetermined period or whenever the contact position is moved at a predetermined distance. The direction identification unit 412 has a function of identifying the direction of the contact position with respect to the reference point, for each predetermined period or whenever the contact position is moved at a predetermined distance.

The direction assignment unit 413 has a function of assigning the direction identified by the direction identification unit 412 to any one of a plurality of set directions which are set in advance, in accordance with the direction. The information output unit 414 has a function of outputting information based on the direction assigned by the direction assignment unit 413.

Figure 22:
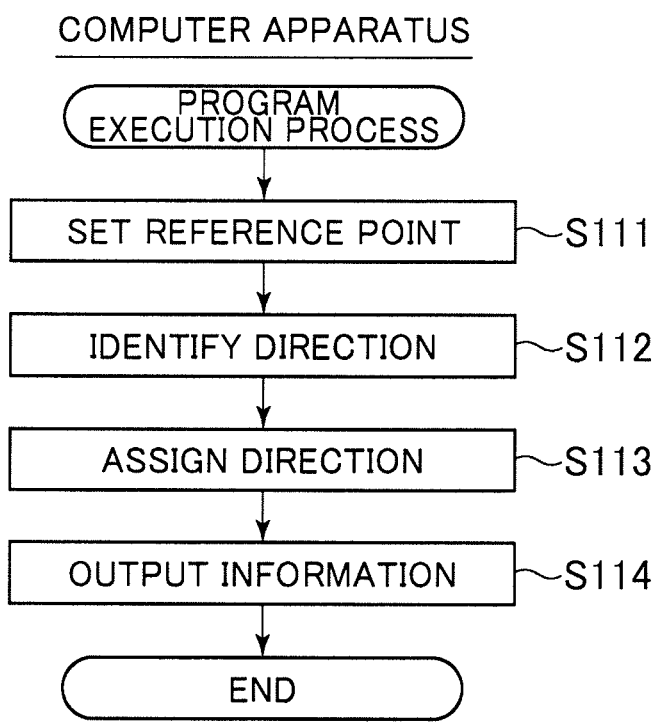
FIG. 22 is a flowchart of the program execution process, which corresponds to at least one embodiment of the invention.

A program execution process in the ninth embodiment of the invention will be described. FIG. 22 is a flowchart of the program execution process, which corresponds to at least one embodiment of the invention.

The computer apparatus 1 sets a user's contact position on an operation unit as a reference point, for each predetermined period or whenever the contact position is moved at a predetermined distance (step S111). Next, the direction of the contact position with respect to the reference point is identified for each predetermined period or whenever the contact position is moved at a predetermined distance (step S112).

The direction identified by the direction identification unit 412 is assigned to any one of a plurality of set directions which are set in advance, in accordance with the direction (step S113). Information based on the direction assigned by the direction assignment unit 413 is output (step S114), and the program execution process is terminated.

As an aspect of the ninth embodiment, the direction identified by the direction identification unit 412 is assigned to any one of the plurality of set directions which are set in advance, in accordance with the direction, and thus the user's direction instruction operation is simplified and an intuitive operation can be performed.

In the ninth embodiment, each of the "operation unit", the "computer apparatus", the "reference point", the "movement of contact position", the "direction", and the "information" has the same contents as those described in the first embodiment.

Tenth Embodiment

Next, an outline of a tenth embodiment of the invention will be described. As a configuration of a computer apparatus in the tenth embodiment, the same configuration as that illustrated in the block diagram of FIG. 5 can be adopted.

Figure 23:
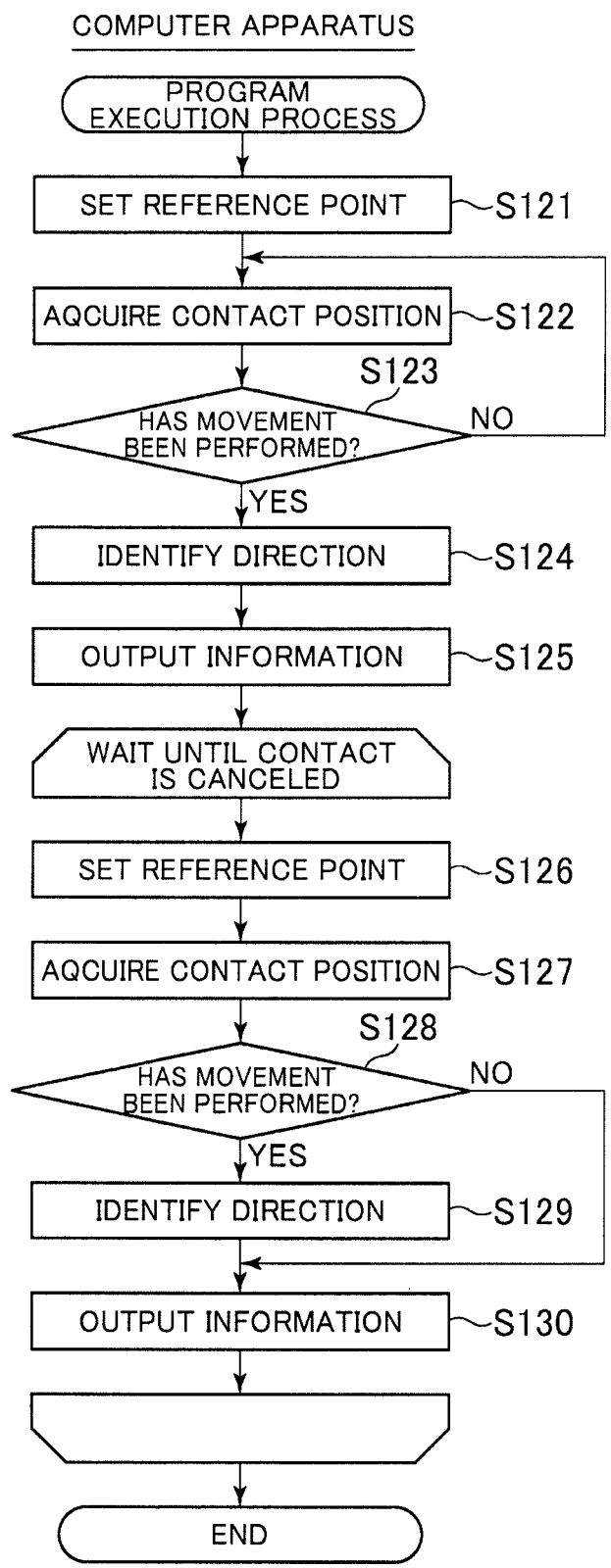
FIG. 23 is a flowchart of the program execution process, which corresponds to at least one embodiment of the invention.

A program execution process in the tenth embodiment of the invention will be described. FIG. 23 is a flowchart of the program execution process, which corresponds to at least one embodiment of the invention.

First, when a user performs a contact operation on a touch input unit 23 of a computer apparatus 1 by using a finger or the like, the touch input unit 23 detects a position where a contact is started and sets the detected position as a reference point (step S121).

The reference point is a point to be reference for identifying information, and thus it is preferable that only one point is present at a certain time. In a case where two or more reference points are present, design may be made so as to identify information from the plurality of reference points.

Next, the present contact position is acquired (step S122). A timing when information on the present contact position is acquired may be acquired whenever a predetermined time elapses after the reference point is set in step S121, or may be acquired in a case where movement from the present contact position is performed by a predetermined distance.

It is preferable that the predetermined time for acquiring the information on the present contact position is a multiple of a frame rate in a display unit 21 of the computer apparatus 1. In addition, it is preferable that the predetermined distance is set in consideration of the size of a region where a touch switch detecting a contact in the touch input unit 23 appropriately and effectively functions.

Thereafter, the reference point which is set in step S121 and the contact position acquired in step S122 are compared with each other to determine whether or not movement has been performed (step S123). Regarding the concept related to determination of whether or not movement has been performed, the same contents as the concept described with reference to FIG. 7 can be adopted.

In a case where it is determined that movement has been performed (YES in step S123), a direction from the reference point to the contact position acquired in step S122 is identified (step S124).

Meanwhile, the identified direction may be assigned to any one of a plurality of set directions which are set in advance, in accordance with the direction. Regarding the assignment of a direction, the contents described with reference to FIG. 9 can be adopted.

In step S123, in a case where it is determined that movement has not been performed (NO in step S123), the processing is repeatedly executed again from the acquisition of the contact position in step S122.

After the direction to the contact position is identified in step S124, information based on the identified direction is output (step S125). Next, a reference point is set to be the contact position acquired in step S122 (step S126).

Subsequently, the present contact position is acquired continuously (step S127). The reference point which is set in step S126 and the contact position acquired in step S27 are compared with each other to determine whether or not movement has been performed (step S128). Regarding the concept related to determination of whether or not movement has been performed, the same contents as the concept described with reference to FIG. 7 can be adopted.

In a case where it is determined that movement has been performed (YES in step S128), a direction from the reference point which is set in step S126 to the contact position acquired in step S127 is identified (step S129), and information based on the identified direction is output (step S130).

In a case where it is determined that movement has not been performed (NO in step S128), information based on the direction identified in step S124 is output (step S130).

The processing from step S126 to step S130 is repeatedly executed until the user's contact with the operation unit is canceled, and the processing is terminated when the contact is canceled.

The case where it is determined in step S128 that movement has not been performed is a case where a contact position is acquired whenever a predetermined time elapses and a case where a contact is stopped and made continuously at the same position without movement after the direction is identified in step S124 or step S129.

The output of the information in step S130 may be the display of characters, a mark, an image, or the like on a display screen 22 included in the display unit 21 of the computer apparatus 1, or may be an output with respect to an external device connected to an interface unit 17. The external device to be assumed may be, for example, a printer, a game machine, or an electronic machine similar thereto.

In the tenth embodiment, the output of the information is stopped in a case where the user's contact with the touch input unit 23 is canceled. That is, at least the set reference point, the acquired contact position, and the identified direction are updated to a state where the user's contact with the touch input unit 23 has not been made. In a case where the user starts to come into contact with the touch input unit 23 again, any one new contact position is set as a reference point.

As an aspect of the tenth embodiment, a first point in a case where the present contact position is set to be a second point is updated as a reference point in a case where it is determined that a direction has been changed, and thus it is possible to continuously operate a virtual controller without separating a finger or the like from the screen, to enable an intuitive operation in which the movement of the finger or the like and an input direction correspond to each other, and to reduce an operation burden on the user.

As an aspect of the tenth embodiment, a direction designated by the user is assigned to an operation direction which is set in advance, and thus the user's direction instruction operation is simplified and an intuitive operation can be performed.

As an aspect of the tenth embodiment, information based on a direction identified during the movement of a contact position is output in a case where the movement of the contact position is stopped after the contact position is moved from a reference point. Thereby, an unnecessary operation, such as continuous movement of the contact position, does not need to be performed, and an operation burden can be reduced.

As an aspect of the tenth embodiment, a position where a contact with the operation unit is started is set as a reference point, and thus the user can set a virtual controller at any point. Thereby, it is possible to provide an interface having excellent user convenience.

As an aspect of the tenth embodiment, the output of information is stopped in a case where a contact with the operation unit is canceled, and thus it is possible to stop inputting an operation instruction by a simple operation and to provide the same operation feeling as that of a controller in the related art while enabling an intuitive operation.

As an aspect of the tenth embodiment, any one new contact position is set as a reference point in a case where a contact with the operation unit is started by the user after a contact with the operation unit is canceled, and thus it is possible to perform an intuitive operation without minding an input based on the previous contact.

In the tenth embodiment, each of the "operation unit", the "computer apparatus", the "reference point", the "movement of contact position", the "direction", the "determination", and the "information" has the same contents as those described in the first embodiment.

In the tenth embodiment, each of the "stop of movement" and the "cancellation of contact" has the same contents as those described in the third embodiment.

Eleventh Embodiment

Figure 24:
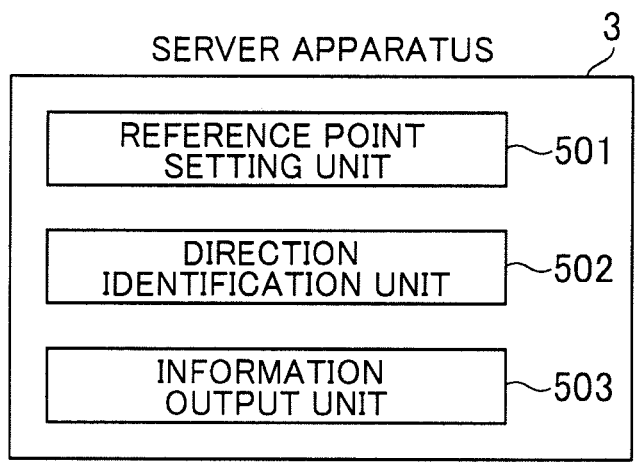
FIG. 24 is a block diagram illustrating a configuration of a server apparatus, which corresponds to at least one embodiment of the invention.

Next, an outline of an eleventh embodiment of the invention will be described. FIG. 24 is a block diagram illustrating a configuration of a server apparatus, which corresponds to at least one embodiment of the invention. A server apparatus 3 includes at least a reference point setting unit 501, a direction identification unit 502, and an information output unit 503.

The reference point setting unit 501 has a function of setting a user's contact position on an operation unit as a reference point, for each predetermined period or whenever the contact position is moved at a predetermined distance. The direction identification unit 502 has a function of identifying the direction of the contact position with respect to the reference point, for each predetermined period or whenever the contact position is moved at a predetermined distance. The information output unit 503 has a function of outputting information based on the direction identified by the direction identification unit 502.

Figure 25:
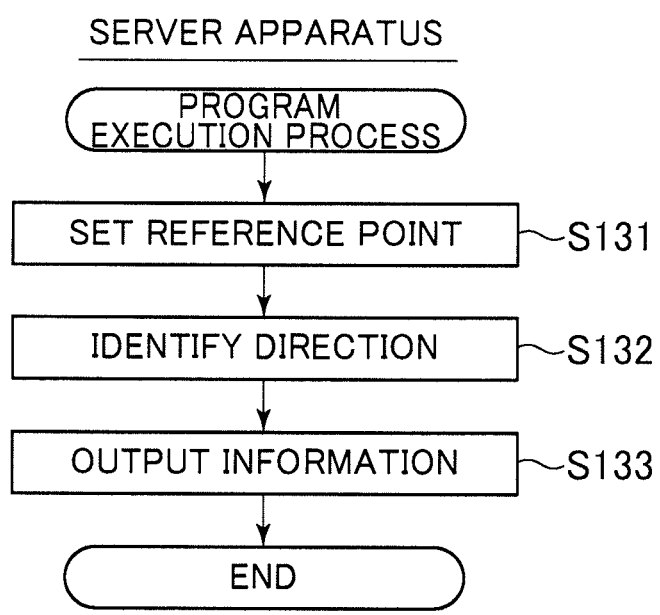
FIG. 25 is a flowchart of the program execution process, which corresponds to at least one embodiment of the invention.

A program execution process in the eleventh embodiment of the invention will be described. FIG. 25 is a flowchart of the program execution process, which corresponds to at least one embodiment of the invention.

A server apparatus 3 sets the user's contact position on the operation unit as a reference point, for each predetermined period or whenever the contact position is moved at a predetermined distance (step S131). Next, the direction of the contact position with respect to the reference point is identified for each predetermined period or whenever the contact position is moved at a predetermined distance (step S132). Information based on the direction identified by the direction identification unit 502 is output (step S133), and the program execution process is terminated.

As an aspect of the eleventh embodiment, it is not necessary to separate a finger or the like from the screen once and bring the finger or the like into contact with the virtual controller again when attempting to change a direction to be input, and thus it is possible to enable an intuitive operation and reduce an operation burden on a user.

In the eleventh embodiment, each of the "operation unit", the "computer apparatus", the "reference point", the "movement of contact position", the "direction", and the "information" has the same contents as those described in the first embodiment.

Twelfth Embodiment

Figure 26:
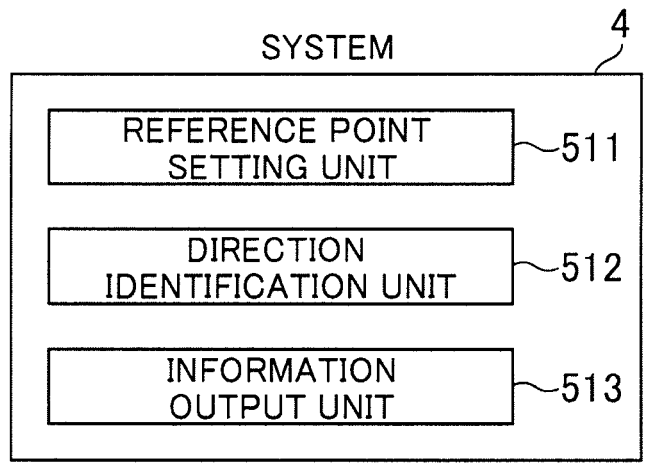
FIG. 26 is a block diagram illustrating a configuration of a system, which corresponds to at least one embodiment of the invention.

Next, an outline of a twelfth embodiment of the invention will be described. FIG. 26 is a block diagram illustrating a configuration of a system, which corresponds to at least one embodiment of the invention. A system 4 includes at least a reference point setting unit 511, a direction identification unit 512, and an information output unit 513.

The reference point setting unit 511 has a function of setting a user's contact position on an operation unit as a reference point, for each predetermined period or whenever the contact position is moved at a predetermined distance. The direction identification unit 512 has a function of identifying the direction of the contact position with respect to the reference point, for each predetermined period or whenever the contact position is moved at a predetermined distance. The information output unit 513 has a function of outputting information based on the direction identified by the direction identification unit 512.

As a configuration of a computer apparatus in the twelfth embodiment, the same configuration as that illustrated in the block diagram of FIG. 13 can be adopted.

Figure 27:
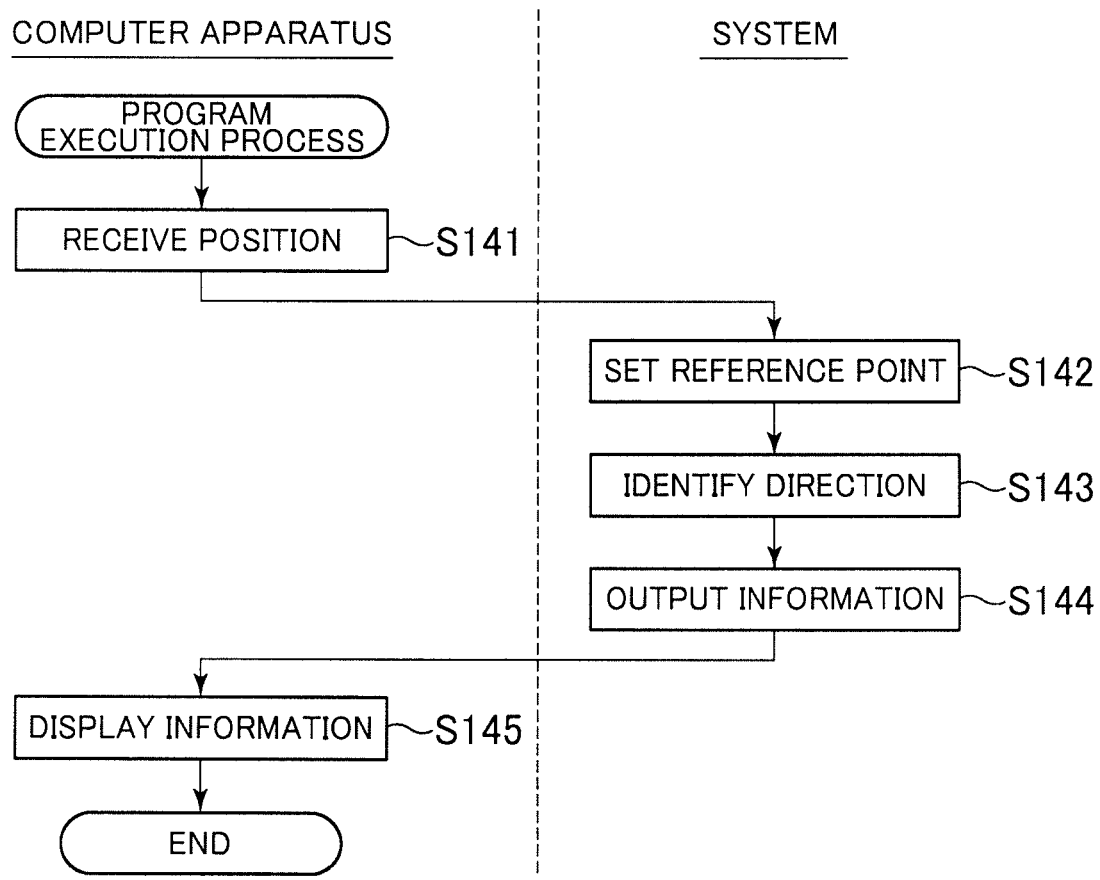
FIG. 27 is a flowchart of the program execution process, which corresponds to at least one embodiment of the invention.

A program execution process in the twelfth embodiment of the invention will be described. FIG. 27 is a flowchart of the program execution process, which corresponds to at least one embodiment of the invention.

First, a computer apparatus 1 receives the user's contact position on an operation unit as a contact position (step S141).

Next, the system 4 sets a user's contact position on an operation unit as a reference point, for each predetermined period or whenever the contact position is moved at a predetermined distance (step S142). Further, the direction of the contact position with respect to the reference point is identified for each predetermined period or whenever the contact position is moved at a predetermined distance (step S143), and information based on the direction identified by the direction identification unit 512 is output (step S144).

Subsequently, the computer apparatus 1 displays the output information (step S145), and the program execution process is terminated.

As an aspect of the twelfth embodiment, it is not necessary to separate a finger or the like from the screen once and bring the finger or the like into contact with the virtual controller again when attempting to change a direction to be input, and thus it is possible to enable an intuitive operation and reduce an operation burden on a user.

In the twelfth embodiment, each of the "operation unit", the "computer apparatus", the "reference point", the "movement of contact position", the "direction", and the "information" has the same contents as those described in the first embodiment. In addition, the "display" has the same contents as those described in the fifth embodiment.

Thirteenth Embodiment

Next, an outline of a thirteenth embodiment of the invention will be described. As a configuration of a computer apparatus in the thirteenth embodiment, the same configuration as that illustrated in the block diagram of FIG. 13 can be adopted. As a flowchart of a program execution process in the thirteenth embodiment, the same flowchart as FIG. 15 can be adopted.

In the thirteenth embodiment, a server apparatus functions as a reference point setter that sets a user's contact position on an operation unit as a reference point, for each predetermined period or whenever the contact position is moved at a predetermined distance, a direction identificator that identifies the direction of the contact position with respect to the reference point, for each predetermined period or whenever the contact position is moved at a predetermined distance, and an information outputter that outputs information based on the direction identified by the direction identificator.

As an aspect of the thirteenth embodiment, it is not necessary to separate a finger or the like from the screen once and bring the finger or the like into contact with the virtual controller again when attempting to change a direction to be input, and thus it is possible to enable an intuitive operation and reduce an operation burden on a user.

In the thirteenth embodiment, each of the "operation unit", the "computer apparatus", the "reference point", the "movement of contact position", the "direction", and the "information" has the same contents as those described in the first embodiment. In addition, the "display" has the same contents as those described in the fifth embodiment.

Fourteenth Embodiment

Next, an outline of a fourteenth embodiment of the invention will be described. As a configuration of a system of the fourteenth embodiment, the same configuration as that illustrated in the block diagram of FIG. 16 can be adopted.

As a configuration of a computer apparatus in the fourteenth embodiment, the same configuration as that illustrated in the block diagram of FIG. 5 can be adopted.

Further, as a configuration of a server apparatus in the fourteenth embodiment, the same configuration as that illustrated in the block diagram of FIG. 17 can be adopted.

Figure 28:
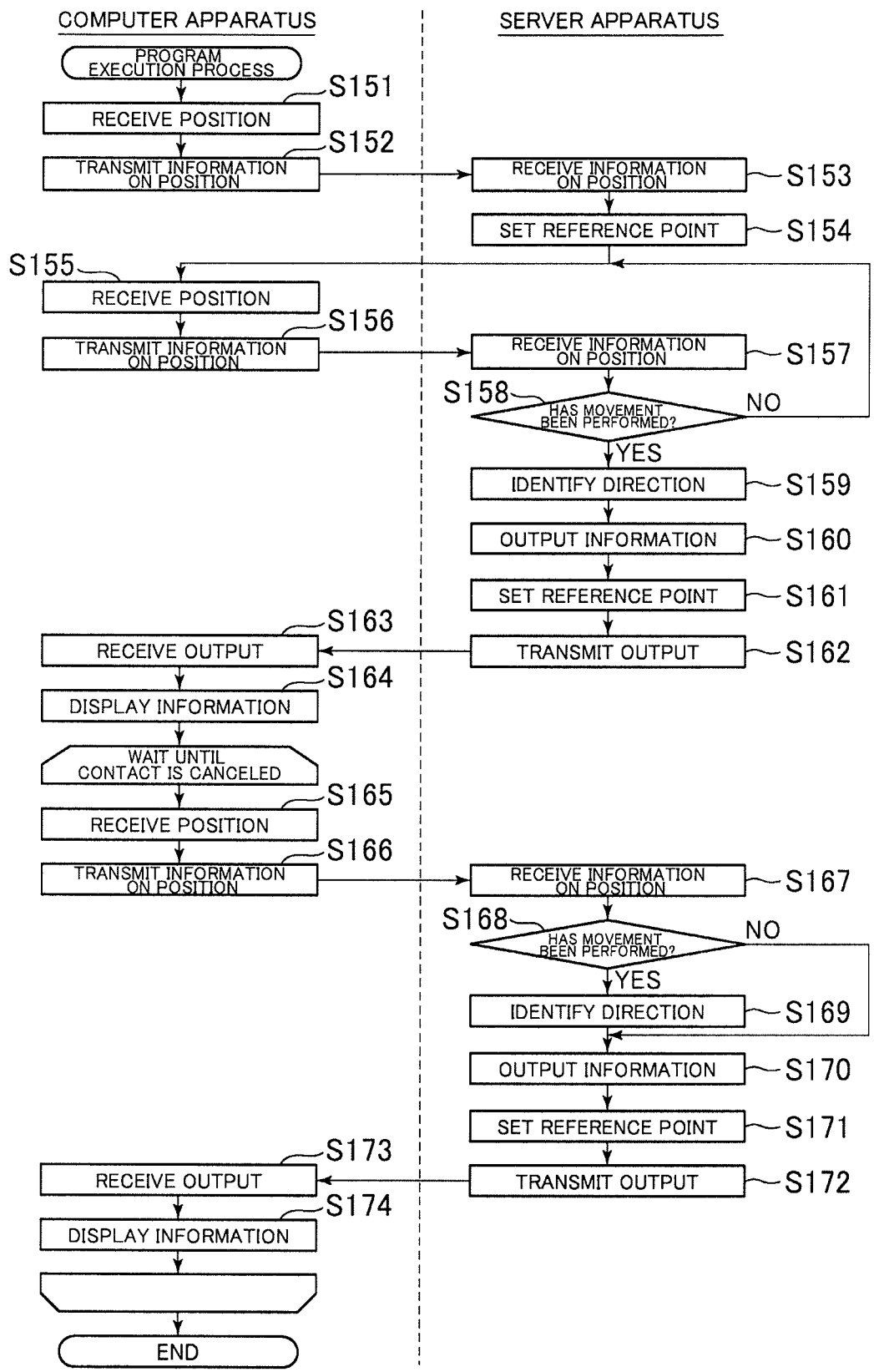
FIG. 28 is a flowchart of the program execution process, which corresponds to at least one embodiment of the invention.

Next, a program execution process in the fourteenth embodiment of the invention will be described. FIG. 28 is a flowchart of the program execution process, which corresponds to at least one embodiment of the invention.

When a user performs a contact operation on a touch input unit 23 of a computer apparatus 1 by using a finger or the like, the touch input unit 23 detects and receives a position where a contact is started (step S151). Next, the computer apparatus 1 transmits information on the received position to a server apparatus 3 (step S152).

The server apparatus 3 receives the information on the position from the computer apparatus 1 (step S153). The received position is set as a reference point (step S154). The server apparatus 3 waits until the next input (designation of a position) is received from the computer apparatus 1.

The reference point is a point to be reference for identifying information, and thus it is preferable that only one point is present at a certain time. In a case where two or more reference points are present, design may be made so as to identify information from the plurality of reference points.

The computer apparatus 1 further receives an operation instruction with respect to the touch input unit 23 from the user (step S155). The information on the received position is transmitted to the server apparatus 3 (step S156).

A timing when information on the present contact position is acquired may be acquired whenever a predetermined time elapses after the position is received in step S151, or may be acquired in a case where movement from the present contact position is performed by a predetermined distance.

It is preferable that the predetermined time for acquiring the information on the present contact position is a multiple of a frame rate in a display unit 21 of the computer apparatus 1. In addition, it is preferable that the predetermined distance is set in consideration of the size of a region where a touch switch detecting a contact in the touch input unit 23 appropriately and effectively functions.

The server apparatus 3 receives the information on the position from the computer apparatus 1 again (step S157). Thereafter, the reference point which is set in step S154 and the position received in step S157 are compared with each other to determine whether or not movement has been performed (step S158). Regarding the concept related to determination of whether or not movement has been performed, the same contents as the concept described with reference to FIG. 7 can be adopted.

In a case where it is determined that movement has been performed (YES in step S158), a direction from the reference point to the position received in step S157 is identified (step S159), and information based on the identified direction is output (step S160).

Meanwhile, the identified direction may be assigned to any one of a plurality of set directions which are set in advance, in accordance with the direction. Regarding the assignment of a direction, the contents described with reference to FIG. 9 can be adopted.

After the information is output in step S160, the position received in step S157 is set as a reference point (step S161). Thereafter, the information which is output in step S160 is transmitted to the computer apparatus 1 (step S162).

In step S158, in a case where it is determined that movement has not been performed (NO in step S158), it is waited until the next input (designation of a position) is received from the computer apparatus 1 again.

The computer apparatus 1 receives the information which is output from the server apparatus 3 (step S163), and displays the information on a display screen 22 (step S164). Subsequently, the computer apparatus 1 receives the user's present contact position (step S165), and transmits information on the received position to the server apparatus 3 (step S166).

The server apparatus 3 receives the information on the position received from the computer apparatus 1 (step S166). The position received in step S166 and the position received in step S157 are compared with each other to determine whether or not movement has been performed (step S168). Regarding the concept related to determination of whether or not movement has been performed, the same contents as the concept described with reference to FIG. 7 can be adopted.

In a case where it is determined that movement has been performed (YES in step S168), a direction from the position received in step S157 to the position received in step S167 is identified (step S169). In a case where movement has not been performed (NO in step S168), information based on the direction identified in step S159 is output again (step S170).

After the information is output in step S170, the position received in step S167 is set as a reference point (step S171). Thereafter, the information which is output in step S170 is transmitted to the computer apparatus 1 (step S172).

The computer apparatus 1 receives the transmitted information (step S173), and displays the information on the display screen 22 (step S174). The processing from step S165 to step S174 is repeatedly executed until the user's contact with the operation unit is canceled, and the processing is terminated when the contact is canceled.

In the fourteenth embodiment, the computer apparatus 1 transmits information by which it can be determined that the user's contact with the touch input unit 23 has been canceled, to the server apparatus 3 in a case where the contact has been canceled. The server apparatus 3 receives the information and stops outputting the information. That is, at least the reference direction, the instruction direction, and the reference point which are set are updated to a state where the user's contact with the touch input unit 23 has not been made. In a case where the user starts to come into contact with the touch input unit 23 again, any one new contact position is set as a reference point.

In the fourteenth embodiment, the system is constituted by the computer apparatus 1 and the server apparatus 3, but is not limited to the above-described embodiments. For example, the functions of the server apparatus 3 can be substituted by the computer apparatus 1 as a system constituted by only a plurality of computer apparatuses 1, without using the server apparatus 3.

In the fourteenth embodiment, the subject of each process is not limited to the above-described configurations. That is, some of the processes performed by the server apparatus 3 may be performed by the computer apparatus 1 in consideration of a communication load, acquisition easiness of information, and the like.

As an aspect of the fourteenth embodiment, a first point when the present contact position is set to be a second point is updated as a reference point in a case where it is determined that a direction has been changed, and thus it is possible to continuously operate a virtual controller without separating a finger or the like from the screen, to enable an intuitive operation in which the movement of the finger or the like and an input direction correspond to each other, and to reduce an operation burden on the user.

As an aspect of the fourteenth embodiment, a direction designated by the user is assigned to an operation direction which is set in advance, and thus the user's direction instruction operation is simplified and an intuitive operation can be performed.

As an aspect of the fourteenth embodiment, information based on a direction identified during the movement of a contact position is output in a case where the movement of the contact position is stopped after the contact position is moved from a reference point. Thereby, an unnecessary operation, such as continuous movement of the contact position, does not need to be performed, and an operation burden can be reduced.

As an aspect of the fourteenth embodiment, a position where a contact with the operation unit is started is set as a reference point, and thus the user can set a virtual controller at any point. Thereby, it is possible to provide an interface having excellent user convenience.

As an aspect of the fourteenth embodiment, the output of information is stopped in a case where a contact with the operation unit is canceled, and thus it is possible to stop inputting an operation instruction by a simple operation and to provide the same operation feeling as that of a controller in the related art while enabling an intuitive operation.

As an aspect of the fourteenth embodiment, any one new contact position is set as a reference point in a case where a contact with the operation unit is started by the user after a contact with the operation unit is canceled, and thus it is possible to perform an intuitive operation without minding an input based on the previous contact.

In the fourteenth embodiment, each of the "operation unit", the "computer apparatus", the "reference point", the "movement of contact position", the "direction", the "determination", and the "information" has the same contents as those described in the first embodiment.

In the fourteenth embodiment, each of the "stop of movement" and the "cancellation of contact" has the same contents as those described in the third embodiment. In addition, the "display" has the same contents as those described in the fifth embodiment.

APPENDIX

The above-described embodiments have been described so that those skilled in the art can implement the following invention.

[1] A program which is executed in a computer apparatus capable of outputting information on the basis of a user's contact position on an operation unit, the program causing the computer apparatus to function as:

a reference point setter that sets the user's any one contact position on the operation unit as a reference point;

a direction identificator that identifies a direction of a second point with respect to a first point when the contact position before the elapse of a predetermined period is defined as the first point and the contact position after the elapse of the predetermined period is defined as the second point in a case where the contact position is moved, or when the contact position before movement at a predetermined distance is defined as the first point and the contact position after movement at the predetermined distance is defined as the second point in a case where the contact position is moved;

a direction change determinator that determines whether or not the direction has been changed by comparing a first direction and a second direction with each other when the direction identified by the direction identificator is defined as the first direction in a case where the first point is a reference point and the direction identified by the direction identificator is defined as the second direction in a case where a present contact position is set to be the second point;

a reference point updator that updates the first point when the present contact position is set to be the second point, as a reference point in a case where it is determined that the direction has been changed; and an information outputter that outputs information based on the direction identified by the direction identificator, wherein in a case where the reference point is updated by the reference point updator, the direction identificator, the direction change determinator, the reference point updator, and the information outputter are executed on the basis of the updated reference point.

[2] The program according to [1], causing the computer apparatus to further function as:

a direction assignmentor that assigns the direction identified by the direction identificator to any one of a plurality of set directions which are set in advance, in accordance with the direction, wherein the information outputter outputs information based on the direction assigned by the direction assignmentor.

[3] The program according to [1] or [2], wherein in a case where the movement of the contact position is stopped after the contact position is moved, the information outputter outputs the information based on the direction identified by the direction identificator, during the movement of the contact position.

[4] The program according to any one of [1] to [3], wherein the reference point setter sets a position where the user's contact on the operation unit is started, as a reference point.

[5] The program according to any one of [1] to [4], wherein the output of the information by the information outputter is stopped in a case where the user's contact on the operation unit is canceled.

[6] The program according to [5], wherein in a case where the user's contact on the operation unit is started after the user's contact on the operation unit is canceled, the reference point setter sets any one new contact position as a reference point.

[7] A computer apparatus which is capable of outputting information on the basis of a user's contact position on an operation unit, the computer apparatus comprising:

a reference point setter that sets the user's any one contact position on the operation unit as a reference point;

a direction identificator that identifies a direction of a second point with respect to a first point when the contact position before the elapse of a predetermined period is defined as the first point and the contact position after the elapse of the predetermined period is defined as the second point in a case where the contact position is moved, or when the contact position before movement at a predetermined distance is defined as the first point and the contact position after movement at the predetermined distance is defined as the second point in a case where the contact position is moved;

a direction change determinator that determines whether or not the direction has been changed by comparing a first direction and a second direction with each other when the direction identified by the direction identificator is defined as the first direction in a case where the first point is a reference point and the direction identified by the direction identificator is defined as the second direction in a case where a present contact position is set to be the second point;

a reference point updator that updates the first point when the present contact position is set to be the second point, as a reference point in a case where it is determined that the direction has been changed; and an information outputter that outputs information based on the direction identified by the direction identificator, wherein in a case where the reference point is updated by the reference point updator, the direction identificator, the direction change determinator, the reference point updator, and the information outputter are executed on the basis of the updated reference point.

[8] A program execution method which is executed in a computer apparatus capable of outputting information on the basis of a user's contact position on an operation unit, the program execution method comprising:

a step of setting the user's any one contact position on the operation unit as a reference point;

a step of identifying a direction of a second point with respect to a first point when the contact position before the elapse of a predetermined period is defined as the first point and the contact position after the elapse of the predetermined period is defined as the second point in a case where the contact position is moved, or when the contact position before movement at a predetermined distance is defined as the first point and the contact position after movement at the predetermined distance is defined as the second point in a case where the contact position is moved;

a step of determining whether or not the direction has been changed by comparing a first direction and a second direction with each other when the direction identified in the step of identifying the direction is defined as the first direction in a case where the first point is a reference point and the direction identified in the step of identifying the direction is defined as the second direction in a case where a present contact position is set to be the second point;

a step of updating the first point when the present contact position is set to be the second point, as a reference point in a case where it is determined that the direction has been changed; and a step of outputting information based on the direction identified in the step of identifying the direction, wherein in a case where the reference point is updated in the step of updating the reference point, the step of identifying the direction, the step of determining the change of the direction, the step of updating the reference point, and the step of outputting the information are executed on the basis of the updated reference point.

[9] A program which is executed in a server apparatus capable of communicating with a computer apparatus including an operation unit and outputting information on the basis of a user's contact position on the operation unit, the program causing the server apparatus to function as:

a reference point setter that sets the user's any one contact position on the operation unit as a reference point;

a direction identificator that identifies a direction of a second point with respect to a first point when the contact position before the elapse of a predetermined period is defined as the first point and the contact position after the elapse of the predetermined period is defined as the second point in a case where the contact position is moved, or when the contact position before movement at a predetermined distance is defined as the first point and the contact position after movement at the predetermined distance is defined as the second point in a case where the contact position is moved;

a direction change determinator that determines whether or not the direction has been changed by comparing a first direction and a second direction with each other when the direction identified by the direction identificator is defined as the first direction in a case where the first point is a reference point and the direction identified by the direction identificator is defined as the second direction in a case where a present contact position is set to be the second point;

a reference point updator that updates the first point when the present contact position is set to be the second point, as a reference point in a case where it is determined that the direction has been changed; and an information outputter that outputs information based on the direction identified by the direction identificator, wherein in a case where the reference point is updated by the reference point updator, the direction identificator, the direction change determinator, the reference point updator, and the information outputter are executed on the basis of the updated reference point.

[10] A server apparatus having the program according to [9] installed therein.

[11] A system which includes a computer apparatus including an operation unit and a server apparatus capable of communicating with the computer apparatus, and which is capable of outputting information on the basis of a user's contact position on the operation unit, the system comprising:

a reference point setter that sets the user's any one contact position on the operation unit as a reference point;

a direction identificator that identifies a direction of a second point with respect to a first point when the contact position before the elapse of a predetermined period is defined as the first point and the contact position after the elapse of the predetermined period is defined as the second point in a case where the contact position is moved, or when the contact position before movement at a predetermined distance is defined as the first point and the contact position after movement at the predetermined distance is defined as the second point in a case where the contact position is moved;

a direction change determinator that determines whether or not the direction has been changed by comparing a first direction and a second direction with each other when the direction identified by the direction identificator is defined as the first direction in a case where the first point is a reference point and the direction identified by the direction identificator is defined as the second direction in a case where a present contact position is set to be the second point;

a reference point updator that updates the first point when the present contact position is set to be the second point, as a reference point in a case where it is determined that the direction has been changed; and an information outputter that outputs information based on the direction identified by the direction identificator, wherein the computer apparatus includes a position receptor that receives the user's contact position on the operation unit, as a contact position, and an information display that displays the output information, and wherein in a case where the reference point is updated by the reference point updator, the direction identificator, the direction change determinator, the reference point updator, and the information outputter are executed on the basis of the updated reference point.

[12] A program which is executed in a computer apparatus capable of communicating with a server apparatus, the program causing the computer apparatus to function as:

a position receptor that receives a user's contact position on an operation unit, as a contact position; and an information display that displays the output information, and wherein the server apparatus functions as a reference point setter that sets the user's any one contact position on the operation unit as a reference point, a direction identificator that identifies a direction of a second point with respect to a first point when the contact position before elapse of a predetermined period is defined as the first point and the contact position after elapse of the predetermined period is defined as the second point in a case where the contact position is moved, or when the contact position before movement at a predetermined distance is defined as the first point and the contact position after movement at the predetermined distance is defined as the second point in a case where the contact position is moved, a direction change determinator that determines whether or not the direction has been changed by comparing a first direction and a second direction with each other when the direction identified by the direction identificator is defined as the first direction in a case where the first point is a reference point and the direction identified by the direction identificator is defined as the second direction in a case where the present contact position is set to be the second point, a reference point updator that updates the first point when the present contact position is set to be the second point, as a reference point in a case where it is determined that the direction has been changed, and an information outputter that outputs information based on the direction identified by the direction identificator, and wherein in a case where the reference point is updated by the reference point updator, the direction identificator, the direction change determinator, the reference point updator, and the information outputter are executed on the basis of the updated reference point.

[13] A computer apparatus having the program according to [12] installed therein.

[14] A program which is executed in a computer apparatus capable of outputting information on the basis of a user's contact position on an operation unit, the program causing the computer apparatus to function as:

a reference point setter that sets the user's contact position on the operation unit as a reference point, for each predetermined period or whenever the contact position is moved at a predetermined distance;

a direction identificator that identifies the direction of the contact position with respect to the reference point, for each predetermined period or whenever the contact position is moved at a predetermined distance; and an information outputter that outputs information based on the direction identified by the direction identificator.

[15] The program according to [14], causing the computer apparatus to further function as:

a direction assignmentor that assigns the direction identified by the direction identificator to any one of a plurality of set directions which are set in advance, in accordance with the direction, wherein the information outputter outputs information based on the direction assigned by the direction assignmentor.

[16] The program according to [14] or [15], wherein in a case where the movement of the contact position is stopped after the contact position is moved, the information outputter outputs the information based on the direction identified by the direction identificator, during the movement of the contact position.

[17] The program according to any one of [14] to [16], wherein the reference point setter sets a position where the user's contact on the operation unit is started, as a reference point.

[18] The program according to any one of [14] to [17], wherein the output of the information by the information outputter is stopped in a case where the user's contact on the operation unit is canceled.

[19] The program according to [18], wherein in a case where the user's contact on the operation unit is started after the user's contact on the operation unit is canceled, the reference point setter sets any one new contact position as a reference point.

[20] A computer apparatus which is capable of outputting information on the basis of a user's contact position on an operation unit, the computer apparatus comprising:

a reference point setter that sets the user's contact position on the operation unit as a reference point, for each predetermined period or whenever the contact position is moved at a predetermined distance;

a direction identificator that identifies the direction of the contact position with respect to the reference point, for each predetermined period or whenever the contact position is moved at a predetermined distance; and an information outputter that outputs information based on the direction identified by the direction identificator.

[21] A program execution method which is executed in a computer apparatus capable of outputting information on the basis of a user's contact position on an operation unit, the program execution method comprising:

a step of setting the user's contact position on the operation unit as a reference point, for each predetermined period or whenever the contact position is moved at a predetermined distance;

a step of identifying the direction of the contact position with respect to the reference point, for each predetermined period or whenever the contact position is moved at a predetermined distance; and a step of outputting information based on the direction identified by the direction identificator.

[22] A program which is executed in a server apparatus capable of communicating with a computer apparatus including an operation unit and outputting information on the basis of a user's contact position on the operation unit, the program causing the server apparatus to function as:

a reference point setter that sets the user's contact position on the operation unit as a reference point, for each predetermined period or whenever the contact position is moved at a predetermined distance;

a direction identificator that identifies the direction of the contact position with respect to the reference point, for each predetermined period or whenever the contact position is moved at a predetermined distance; and an information outputter that outputs information based on the direction identified by the direction identificator.

[23] A server apparatus having the program according to [22] installed therein.

[24] A system which includes a computer apparatus including an operation unit and a server apparatus capable of communicating with the computer apparatus, and which is capable of outputting information on the basis of a user's contact position on the operation unit, the system comprising:

a reference point setter that sets the user's contact position on the operation unit as a reference point, for each predetermined period or whenever the contact position is moved at a predetermined distance;

a direction identificator that identifies the direction of the contact position with respect to the reference point, for each predetermined period or whenever the contact position is moved at a predetermined distance; and an information outputter that outputs information based on the direction identified by the direction identificator, wherein the computer apparatus includes a position receptor that receives the user's contact position on the operation unit, as a contact position, and an information display that displays the output information.

[25] A program which is executed in a computer apparatus capable of communicating with a server apparatus capable of outputting information, on the basis of a user's contact position on an operation unit, the program causing the computer apparatus to function as:

a position receptor that receives the user's contact position on the operation unit, as a contact position; and an information display that displays the output information, and wherein the server apparatus functions as a reference point setter that sets the user's contact position on the operation unit as a reference point, for each predetermined period or whenever the contact position is moved at a predetermined distance, a direction identificator that identifies a direction of the contact position with respect to the reference point, for each predetermined period or whenever the contact position is moved at a predetermined distance, and an information outputter that outputs information based on the direction identified by the direction identificator.

[26] A computer apparatus having the program according to [25] installed therein.

The invention claimed is:

1. A non-transitory computer-readable recording medium including a program which is executed in a computer apparatus, the computer apparatus being capable of outputting information based on contact position of a user on a display, the program causing the computer apparatus to:

set an initial contact position of the user on the display as a reference point;

identify a reference direction of a second point with respect to a first point, the initial contact position being defined as the first point and a subsequent contact position one of after an elapse of a predetermined period or movement of a predetermined distance being defined as the second point in a case where the initial contact position is moved;

determine whether or not the reference direction has been changed by comparing the reference direction and a second direction, the second direction including the initial contact position being defined as the first point and a present contact position being defined as the second point;

update the reference point and the first point to be the subsequent contact position when the present contact position is defined as the second point in a first case where the reference direction has been changed; and output information based on the reference direction in a second case where the reference direction has not been changed, wherein in the first case where the subsequent contact position is updated to be the reference point, the computer apparatus again identifies the reference direction, determines whether or not the reference direction is changed, updates the reference point in the first case, and outputs the information in the second case.

2. The non-transitory computer-readable recording medium according to claim 1, the program further causing the computer apparatus to assign the reference direction to any one of a plurality of set directions, the plurality of set directions being set in advance, wherein the information is output based on assigned reference direction.

3. The non-transitory computer-readable recording medium according to claim 1, wherein in a case where movement from the initial contact position is stopped, the computer apparatus outputs the information based on the reference direction identified during the movement from the initial contact position.

4. The non-transitory computer-readable recording medium according to claim 1, wherein the computer apparatus sets a position where contact by the user on the display is started as the reference point.

5. The non-transitory computer-readable recording medium according to claim 1, wherein the output of the information is stopped in a case where contact by the user on the display is canceled.

6. The non-transitory computer-readable recording medium according to claim 5, wherein in a case where a second contact by the user on the display is started after a first contact by the user on the display is canceled, any one new contact position is set as the reference point.

7. A computer apparatus which is capable of outputting information based on a contact position of a user on a display, the computer apparatus comprising:

a processor; and a memory including a program that, when executed by the processor, causes the processor to perform operations, the operations including:

setting an initial contact position of the user on the display as a reference point;

identifying a reference direction of a second point with respect to a first point, the initial contact position being defined as the first point and a subsequent contact position one of after an elapse of a predetermined period or movement of a predetermined distance being defined as the second point in a case where the initial contact position is moved;

determining whether or not the reference direction has been changed by comparing the reference direction and a second direction, the second direction including the initial contact position being defined as the first point and a present contact position being defined as the second point;

updating the reference point and the first point to be the subsequent contact position when the present contact position is defined as the second point in a first case where the reference direction has been changed; and outputting information based on the reference direction in a second case where the reference direction has not been changed, wherein in the first case where the subsequent contact position is updated to be the reference point, the processor again identifies the reference direction, determines whether or not the reference direction is changed, updates the reference point in the first case, and outputs the information in the second case.

8. A method which is executed in a computer apparatus, the computer apparatus being capable of outputting information based on a contact position of a user on a display, the method comprising:

setting an initial contact position of the user on the display as a reference point;

identifying a reference direction of a second point with respect to a first point, the initial contact position being defined as the first point and a subsequent contact position one of after an elapse of a predetermined period or movement of a predetermined distance being defined as the second point in a case where the initial contact position is moved;

determining whether or not the reference direction has been changed by comparing the reference direction and a second direction, the second direction including the initial contact position being defined as the first point and a present contact position being defined as the second point;

updating the reference point and the first point to be the subsequent contact position when the present contact position is defined as the second point in a first case where the direction reference has been changed; and outputting information based on the reference direction in a second case where the reference direction has not been changed, wherein in the first case where the subsequent contact position is updated to be the reference point, the identifying the reference direction, the determining whether or not the reference direction has been changed, the updating the reference point in the first case, and the outputting the information in the second case are executed again based on the updated reference point.

9. A non-transitory computer-readable recording medium including a program which is executed in a computer apparatus, the computer apparatus being capable of outputting information based on a contact position of a user on a display, the program causing the computer apparatus:

set an initial contact position of the user on the display as a reference point one of for each predetermined period or when the contact position is moved a predetermined distance;

identify a reference direction of a subsequent contact position with respect to the reference point;

determine whether or not a direction has been changed by comparing the reference direction and an instruction direction;

update the reference point to be the subsequent contact position in a first case where the direction has been changed; and output information based on the instruction direction in a second case where the direction has not been changed, wherein in the first case where the subsequent contact position is updated to be the reference point, the computer apparatus again identifies the reference direction, determines whether or not the direction is changed, updates the reference point in the first case, and outputs the information in the second case.

10. The non-transitory computer-readable recording medium according to claim 9, the program further causing the computer apparatus to:

assign the reference direction to any one of a plurality of set directions, the plurality of set directions being set in advance, wherein the information is based on the assigned reference direction.

11. The non-transitory computer-readable recording medium according to claim 9, wherein in a case where movement from the initial contact position is stopped, the computer apparatus outputs the information based on the reference direction identified during the movement from the initial contact position.

12. The non-transitory computer-readable recording medium according to claim 9, wherein the computer apparatus sets a position where contact by the user on the display is started as the reference point.

13. The non-transitory computer-readable recording medium according to claim 9, wherein the output of the information is stopped in a case where contact by the user on the display is canceled.

14. The non-transitory computer-readable recording medium according to claim 13, wherein in a case where a second contact by the user on the display is started after a first contact by the user on the display is canceled, any one new contact position is set as the reference point.

15. A computer apparatus which is capable of outputting information based on a contact position of a user on a display, the computer apparatus comprising:

a processor; and a memory including a program that, when executed by the processor, causes the processor to perform operations, the operations including:

set an initial contact position of the user on the display as a reference point one of for each predetermined period or when the contact position is moved a predetermined distance;

identify a reference direction of a subsequent contact position with respect to the reference point;

determine whether or not a direction has been changed by comparing the reference direction and an instruction direction;

update the reference point to be the subsequent contact position in a first case where the direction has been changed; and output information based on the instruction direction in a second case where the direction has not been changed, wherein in the first case where the subsequent contact position is updated to be the reference point, the computer apparatus again identifies the reference direction, determines whether or not the direction is changed, updates the reference point in the first case, and outputs the information in the second case.

16. A method which is executed in a computer apparatus, the computer apparatus being capable of outputting information based on a contact position of a user on a display, the method comprising:

setting an initial contact position of the user on the display as a reference point one of for each predetermined period or when the contact position is moved a predetermined distance;

identifying a reference direction of a subsequent contact position with respect to the reference point;

determining whether or not a direction has been changed by comparing the reference direction and an instruction direction;

updating the reference point to be the subsequent contact position in a first case where the direction has been changed; and outputting information based on the instruction direction in a second case where the direction has not been changed, wherein in the first case where the subsequent contact position is updated to be the reference point, the identifying the reference direction, the determining whether or not the direction has been changed, the updating the reference point in the first case, and the outputting the information in the second case are executed again based on the updated reference point.

* * * * *

UNITED STATES PATENT AND TRADEMARK OFFICE
CERTIFICATE OF CORRECTION

PATENT NO.       : 10,901,549 B2
APPLICATION NO.  : 16/086948
DATED            : January 26, 2021
INVENTOR(S)      : M. Ichikawa et al.

It is certified that error appears in the above-identified patent and that said Letters Patent is hereby corrected as shown below:

At Column 37, Line 60 (Claim 1, Line 4) please change "based on contact position" to --based on a contact position--.

At Column 39, Line 61 (Claim 9, Line 5) please change "the computer apparatus:" to --the computer apparatus to:--.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*